US010943096B2

(12) United States Patent
Yi et al.

(10) Patent No.: US 10,943,096 B2
(45) Date of Patent: Mar. 9, 2021

(54) HIGH-QUALITY TRAINING DATA PREPARATION FOR HIGH-PERFORMANCE FACE RECOGNITION SYSTEMS

(71) Applicant: AltumView Systems Inc., Burnaby (CA)

(72) Inventors: Zili Yi, Coquitlam (CA); Xing Wang, Burnaby (CA); Him Wai Ng, Coquitlam (CA); Sami Ma, Burnaby (CA); Jie Liang, Coquitlam (CA)

(73) Assignee: AltumView Systems Inc., Port Moody (CA)

( * ) Notice: Subject to any disclaimer, the term of this patent is extended or adjusted under 35 U.S.C. 154(b) by 122 days.

(21) Appl. No.: 15/859,652

(22) Filed: Dec. 31, 2017

(65) Prior Publication Data
US 2019/0205620 A1 Jul. 4, 2019

(51) Int. Cl.
*G06K 9/00* (2006.01)
*G06K 9/62* (2006.01)
(Continued)

(52) U.S. Cl.
CPC ..... *G06K 9/00288* (2013.01); *G06K 9/00228* (2013.01); *G06K 9/00268* (2013.01);
(Continued)

(58) Field of Classification Search
CPC ............ G06K 9/00288; G06K 9/00228; G06K 9/00268; G06K 9/00926; G06K 9/4628;
(Continued)

(56) References Cited

U.S. PATENT DOCUMENTS

| 7,515,740 B2 * | 4/2009 | Corcoran ........... G06K 9/00275 382/118 |
| 8,805,653 B2 * | 8/2014 | Huh ........................ G06F 17/16 382/118 |

(Continued)

OTHER PUBLICATIONS

Sung, Kah-Kay. "Learning and example selection for object and pattern detection." (1996). (Year: 1996).*
(Continued)

*Primary Examiner* — Shefali D Goradia

(57) ABSTRACT

Embodiments described herein provide various examples of a face-image training data preparation system for performing large-scale face-image training data acquisition, preprocessing, cleaning, balancing, and post-processing. The disclosed training data preparation system can collect a very large set of loosely-labeled images of different people from the public domain, and then generate a raw training dataset including a set of incorrectly-labeled face images. The disclosed training data preparation system can then perform cleaning and balancing operations on the raw training dataset to generate a high-quality face-image training dataset free of the incorrectly-labeled face images. The processed high-quality face-image training dataset can be subsequently used to train deep-neural-network-based face recognition systems to achieve high performance in various face recognition applications. Compared to conventional face recognition systems and techniques, the disclosed training data preparation system and technique provide a fully-automatic, highly-deterministic and high-quality training data preparation procedure which does not rely heavily on assumptions.

39 Claims, 12 Drawing Sheets

(51) Int. Cl.
*G06K 9/46* (2006.01)
*G06N 5/02* (2006.01)
*G06N 20/00* (2019.01)

(52) U.S. Cl.
CPC ....... *G06K 9/00926* (2013.01); *G06K 9/4628* (2013.01); *G06K 9/6212* (2013.01); *G06K 9/6215* (2013.01); *G06K 9/6256* (2013.01); *G06K 9/6257* (2013.01); *G06K 9/6262* (2013.01); *G06K 9/6274* (2013.01); *G06N 5/022* (2013.01); *G06N 20/00* (2019.01)

(58) Field of Classification Search
CPC .. G06K 9/6212; G06K 9/6215; G06K 9/6256; G06K 9/6257; G06K 9/6262; G06K 9/6274; G06N 20/00; G06N 5/022
See application file for complete search history.

(56) References Cited

U.S. PATENT DOCUMENTS

| | | | |
|---|---|---|---|
| 9,589,351 B2* | 3/2017 | Jang | G06K 9/00295 |
| 10,025,950 B1* | 7/2018 | Avasarala | G06K 9/00281 |
| 10,417,532 B2* | 9/2019 | Liang | G06K 9/4628 |
| 2017/0083755 A1* | 3/2017 | Tang | G06K 9/00281 |
| 2018/0165554 A1* | 6/2018 | Zhang | G06K 9/6269 |

OTHER PUBLICATIONS

Kumar, Berg, "Describable Visual Attributes for Face Verification and Image Search", Advanced Topics in Multimedia Analysis and Indexing, Spring 2011, NTU, PAMI, 2011, (Year: 2011).*

* cited by examiner

HIGH-QUALITY TRAINING DATA PREPARATION FOR HIGH-PERFORMANCE FACE RECOGNITION SYSTEMS

TECHNICAL FIELD

The present disclosure generally relates to the field of machine learning and artificial intelligence, and more specifically to systems, devices and techniques for preparing high-quality training dataset of labeled face images for high-performance face recognition systems.

BACKGROUND

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Deep learning has achieved numerous successes in many artificial intelligence and machine learning applications, such as face recognition, image classification, image caption generation, visual question answering, and automatic driving cars. Among these applications, face recognition applications are among the most popular and fastest growing applications thanks to the advancement in deep learning, and in particular to the unequivocal successes of applying convolutional neutral network (CNN) to face recognition tasks. A CNN-based face recognition system is typically designed to solve a series of problems which often include: face detection, i.e., finding all faces within an input image; face verification, i.e., validating if the claimed identity of a detected face is the same person of the claimed identify; face recognition, i.e., identifying the person based on the detected face; and face clustering, i.e., finding common people among the detected faces.

While state-of-the-art face detection techniques have achieved very high accuracy and reliability, the accuracy and reliability of the existing face recognition systems still have plenty rooms for improvement. Among various challenges to building successful face recognition systems, constructing a high-quality training dataset remains one of the more critical and difficult challenges. An effective and reliable face recognition system relies on a large-scale, diverse, and accurately-labeled training dataset. However, training datasets satisfying these qualities are generally restricted to a few internet companies in control of vast amount of user data. Hence, people often have to build their own training datasets by mining freely available data from the Internet.

For face recognition tasks, the face image data can be collected from the Internet using search engines or web crawlers. For example, using a search engine, images of a particular celebrity can be collected using the name of the celebrity as a search query. Hence, face image data collected from the Internet are often organized into groups of identically-labeled images, wherein each group corresponds to a unique identity of a person. However, raw face image data collected from the Internet are generally "dirty," because each group of identically-labeled images often contains undesirable images such as falsely-labeled images, low-quality images, and images containing faces of multiple people. While it is possible to manually "clean" the raw data to remove these undesirable face images, manual cleaning becomes expensive and inefficient for large-scale raw datasets. As a result, researchers and engineers have been actively developing automatic raw training data cleaning techniques to efficiently remove "noisy" data from the raw training datasets. Unfortunately, existing training data cleaning techniques often rely on filtering raw training data based on low-level features and over-simplified assumptions, and the results from these techniques are often far from satisfactory.

SUMMARY

Embodiments described herein provide various examples of a face-image training data preparation system for performing large-scale face-image training data acquisition, preprocessing, cleaning, balancing, and post-processing. In some embodiments, the disclosed face-image training data preparation system can receive a raw training dataset containing different types of undesirable face images. The disclosed training data preparation system can then perform cleaning and balancing operations on the raw training dataset to generate a high-quality face-image training dataset free of the undesirable face images. The processed high-quality face-image training dataset can be subsequently used to train deep-neural-network-based face recognition systems to achieve high performance in various face recognition applications. Compared to conventional face recognition systems and techniques, the disclosed training data preparation system and technique provide a fully-automatic, highly-deterministic and high-quality training data preparation procedure which does not rely heavily on assumptions.

In various embodiments, the disclosed face-image training data preparation system includes at least a training dataset cleaning module and a training dataset balancing module, and can optionally include a training dataset preprocessing module and a training dataset post-processing module, all of which can be applied to a raw training dataset of loosely-labeled face images to generate a high-quality training dataset of correctly-labeled face images. In some embodiments, the disclosed training dataset cleaning module is configured to perform the function of face-label verification, i.e., validating if the claimed/labeled identity of a face image is indeed the same person of the claimed/labeled identify (i.e., if the face image has been correctly-labeled). Hence, a labeled face image which fails the identity validation can be removed from the training dataset. However, instead of processing individually-labeled face images independently, the disclosed training dataset cleaning module can process a raw training dataset comprising many groups of identically-labeled face images of a large number of identities or people, by processing each group of identically-labeled face images of each identity/person as a whole.

More specifically, the disclosed training dataset cleaning module can process a group of identically-labeled face images of a given identity by first embedding each image in the group of identically-labeled face images. For example, the disclosed training dataset cleaning module can perform Euclidean embedding (i.e., feature extraction) on each image in a group of identically-labeled face images using a deep neural network, wherein the deep neural network is pre-trained so that a cross product (also referred to as "cosine similarity," "Euclidean distance," and "similarity score" throughout) between two embedded/extracted feature vectors directly corresponds to face similarity between the two corresponding face images. In other words, two face images of the same person would have a greater similarity score between their corresponding feature vectors whereas two face images of two different people would have a smaller similarity score between their corresponding feature vectors. Hence, the disclosed training dataset cleaning module can construct a similarity matrix for the group of images. Once the similarity matrix is constructed, face-label verification for the group of identically-labeled face images can be implemented by applying one or more properly designed thresholds to the similarity scores among the group of identically-labeled face images. Note that when using the above-described Euclidean embedding of the face images as the training data, face recognition becomes a k-NN classification problem, and face clustering can be achieved by using off-the-shelf techniques such as k-means or agglomerative clustering.

In one aspect, a process for preparing high-quality face-image training data for a face recognition system is disclosed. This process can first receive a training dataset including a plurality of groups of identically-labeled face images associated with a plurality of identities, each group of identically-labeled face images is labeled with a unique identity among the plurality of identities, and the training dataset includes a set of undesirable images. Next, for each group of identically-labeled face images of a given identity in the training dataset, the process identifies a subset of undesirable images within the group of identically-labeled face images, and subsequently generates a cleaned group of identically-labeled face images of the given identity without the subset of undesirable images. The process then combines the cleaned groups of identically-labeled face images to obtain a cleaned training dataset for use in training a face recognition model.

In some embodiments, the process identifies the subset of undesirable images within the group of identically-labeled face images by first identifying a subset of highly-similar images within the group of identically-labeled face images as a first reference image set and designating images in the group of identically-labeled face images but not in the first reference image set as a first candidate image set. The process then identifies the subset of undesirable images from the first candidate image set based on the first reference image set.

In some embodiments, the process identifies the subset of highly-similar images within the group of identically-labeled face images as the first reference image set by: computing a similarity matrix of pairs of images in the group of identically-labeled face images, wherein each element in the similarity matrix is a similarity score between the corresponding pair of images in the group of identically-labeled face images; applying a first threshold value to the similarity matrix to separate the elements in the similarity matrix into a first set of elements greater than or equal to the first threshold and a second set of elements smaller than the first threshold; processing the first set of elements to generate one or more image clusters, each image cluster includes a subset of face images in the group of identically-labeled face images that is associated with the first set of elements, and each image cluster includes one or more images which are determined to be highly similar to one another; and identifying an image cluster within the one or more image clusters that contains the largest number of images among the one or more image clusters as the first reference set.

In some embodiments, the process generates the one or more image clusters by building one or more connected graphs based on the associated set of similarity scores.

In some embodiments, the process computes the similarity matrix for the group of identically-labeled face images by first extracting a feature vector for each image in the group of identically-labeled face images based on a pre-trained face embedded model. Next, for each pair of the images in the group of identically-labeled face images, the process computes the similarity score between the pair of image as a Euclidean distance between the two associated feature vectors.

In some embodiments, the process selects the first threshold value such that the probability that two identically-labeled face images do not have the same identity when the similarity score between the two identically-labeled face images being greater than or equal to the first threshold is below a used-specified error rate.

In some embodiments, the process identifies the subset of undesirable images in the first candidate image set by: identifying a first subset of images in the first candidate image set as being qualified for recollection and a second subset of images in the first candidate image set as being unqualified for recollection and further identifying the subset of undesirable images in the second subset of images unqualified for recollection.

In some embodiments, the process identifies the first subset of images in the first candidate image set as being qualified for recollection by: for each image in the first candidate image set, obtaining a set of similarity scores between the image and each image in the first reference image set and subsequently computing a combined similarity score of the image with respect to the first reference image set; and applying a second threshold value to the set of combined similarity scores computed for the first candidate image set to separate the first candidate image set into the first subset of images qualified for recollection and the second subset of images not qualified for recollection.

In some embodiments, the process combines the first reference image set and the first subset of images qualified for recollection to obtain the cleaned group of identically-labeled face images. The process additionally identifies the second subset of images not qualified for recollection as the subset of undesirable images.

In some embodiments, the process selects the second threshold value such that the probability that an image having a combined similarity score with respect to the first reference image set greater than or equal to the second threshold value does not have the same identity as the first reference image set is below a used-specified error rate.

In some embodiments, the second threshold value is smaller than the first threshold value.

In some embodiments, the process computes the combined similarity score of the image with respect to the first reference image set by computing a weighted average of the set of computed similarity scores. In some embodiments, computing the weighted average of the set of computed similarity scores includes providing a higher weight value to a larger similarity score in the set of computed similarity scores.

In some embodiments, for a computed similarity score, the weight value associated with the computed similarity score in the weighted average is determined based on $\exp(r \cdot s)$, wherein r is a positive number between 2-10 and s is the computed similarity score.

In some embodiments, the process further performs the steps of: forming a second reference image set by combining the first reference image set and the first subset of images qualified for recollection; designating images in the group of identically-labeled face images but not in the second reference image set as a second candidate image set; and identifying the subset of undesirable images in the second candidate image set based on the second reference image set.

In some embodiments, the process identifies the subset of undesirable images in the second candidate image set based on the second reference image set by: for each image in the second candidate image set, computing a set of similarity scores between the image and each image in the second reference image set and subsequently computing a combined similarity score of the image with respect to the second reference image set. Next, the process applies a third threshold value to the set of combined similarity scores associated with the second candidate image set to separate the second candidate image set into a third subset of images which is qualified for recollection and a fourth subset of images which is not qualified for recollection. The process then identifies the fourth subset of images not qualified for recollection as the subset of undesirable images.

In some embodiments, the process combines the second reference image set and the third subset of images qualified for recollection to obtain the cleaned group of identically-labeled face images of the associated identity without the subset of undesirable images.

In some embodiments, the third threshold value is smaller than the second threshold value, and the second threshold value is smaller than the first threshold value.

In some embodiments, prior to receiving the training dataset, the process uses one or more image crawlers and the plurality of identities as search queries to mine a set of loosely-labeled images matching the plurality of identities on the Internet.

In some embodiments, the process generates the training dataset by: for each loosely-labeled image in the set of loosely-labeled images, detecting one or more faces within the loosely-labeled image and subsequently cropping out one or more face images associated with the one or more detected faces from the loosely-labeled image; and forming a group of identically-labeled face images by combining a set of cropped face images from a subset of loosely-labeled images of the same identity.

In some embodiments, prior to forming the group of identically-labeled face images, the process preprocesses the set of cropped face images so that the preprocessing set of cropped face images have an identical image size and the faces within the preprocessed set of cropped face images are substantially centered within the respective face images.

In some embodiments, the process preprocesses the set of cropped face images by additionally performing rotation operations on the set of cropped face images so that the preprocessing set of cropped face images have substantially the same pose.

In some embodiments, the plurality of identities includes both a set of Asian people and a set of non-Asian people.

In some embodiments, after generating the cleaned group of identically-labeled face images of the associated identity, the process further performs the steps of: balancing each of the cleaned group of identically-labeled face images by forcing the number of face images within the cleaned group of identically-labeled face images to be equal to a target number; and combining the cleaned and balanced groups of identically-labeled face images to obtain a high-quality training dataset for use in training a face recognition model.

In some embodiments, the set of undesirable images includes one or more of: (1) a subset of images wherein each image in the subset is labeled with an identity that does not match the person within the image; (2) a subset of images wherein each image in the subset does not have a person; (3) a subset of images wherein each image in the subset has a very low quality; and (4) a subset of images which are substantially identical to one another.

In another aspect, an apparatus for preparing high-quality face-image training data for a face recognition system is disclosed. This apparatus includes: one or more processors; and a memory storing instructions that, when executed by the one or more processors, cause the apparatus to: receive a training dataset including a plurality of groups of identically-labeled face images associated with a plurality of identities, wherein each group of identically-labeled face images is labeled with an associated identity among the plurality of identities, and wherein the training dataset includes a set of undesirable images; for each group of identically-labeled face images of an associated identity in the training dataset, identify a subset of undesirable images within the group of identically-labeled face images and generate a cleaned group of identically-labeled face images of the associated identity without the subset of undesirable images; and combine the cleaned groups of identically-labeled face images to obtain a cleaned training dataset for use in training a face recognition model.

In yet another aspect, a system for preparing high-quality face-image training data for a face recognition system is disclosed. This system includes: one or more processors; a memory coupled to the one or more processors; a receiving module that receives a training dataset including a plurality of groups of identically-labeled face images associated with a plurality of identities, each group of identically-labeled face images is labeled with an associated identity among the plurality of identities, and the training dataset includes a set of undesirable images; a training dataset cleaning module which, for each group of identically-labeled face images of an associated identity in the training dataset: identifies a subset of undesirable images within the group of identically-labeled face images and generates a cleaned group of identically-labeled face images of the associated identity without the subset of undesirable images; and a training dataset generation module that combines the cleaned groups of identically-labeled face images to obtain a cleaned training dataset for use in training a face recognition model.

In some embodiments, the training dataset cleaning module is configured to: identify a subset of highly-similar images within the group of identically-labeled face images as a first reference image set; designate images in the group of identically-labeled face images but not in the first reference image set as a first candidate image set; and identify the subset of undesirable images from the first candidate image set based on the first reference image set.

In some embodiments, the training dataset cleaning module is further configured to: compute a similarity matrix of pairs of images in the group of identically-labeled face images, wherein each element in the similarity matrix is a similarity score between the corresponding pair of images in the group of identically-labeled face images; apply a first threshold value to the similarity matrix to separate the elements in the similarity matrix into a first set of elements greater than or equal to the first threshold and a second set of elements smaller than the first threshold; process the first set of elements to generate one or more image clusters, wherein each image cluster includes a subset of face images in the group of identically-labeled face images that is associated with the first set of elements, and each image cluster includes one or more images which are determined to be highly similar to one another; and identifying an image cluster within the one or more image clusters that contains the largest number of images among the one or more image clusters as the first reference set.

In some embodiments, the training dataset cleaning module is further configured to: identify a first subset of images in the first candidate image set as being qualified for recollection and a second subset of images in the first candidate image set as being unqualified for recollection; and further identify the subset of undesirable images in the second subset of images unqualified for recollection.

In some embodiments, the training dataset cleaning module is further configured to identify the subset of undesirable images by: for each image in the first candidate image set, obtaining a set of similarity scores between the image and each image in the first reference image set and subsequently compute a combined similarity score of the image with respect to the first reference image set; applying a second threshold value to the set of combined similarity scores computed for the first candidate image set to separate the first candidate image set into the first subset of images qualified for recollection and the second subset of images not qualified for recollection; combining the first reference image set and the first subset of images qualified for recollection to obtain the cleaned group of identically-labeled face images; and identifying the second subset of images not qualified for recollection as the subset of undesirable images.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
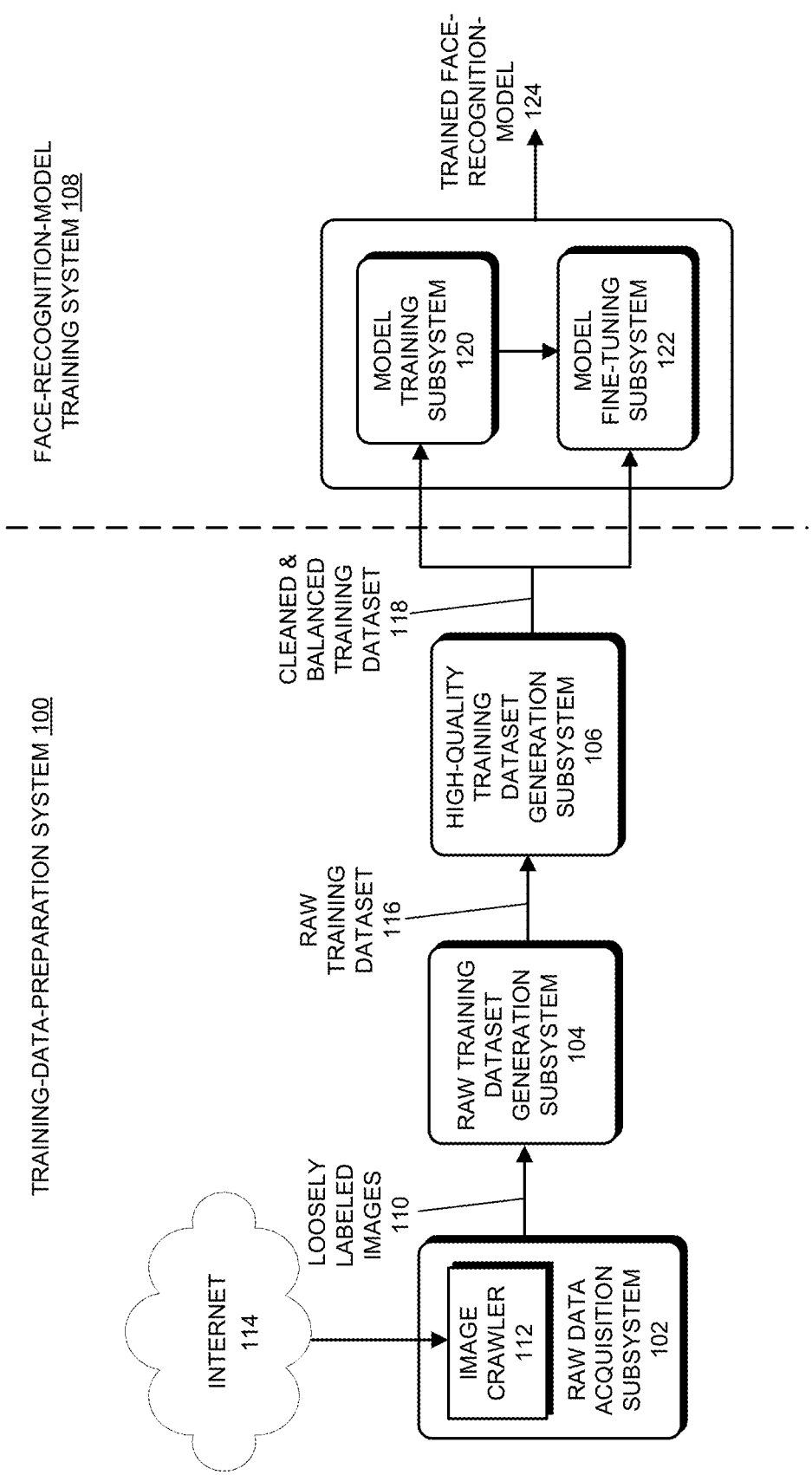
FIG. 1 shows a block diagram of an exemplary face-recognition-model training-data-preparation system in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In this patent disclosure, various examples of a face-image training data preparation system for performing large-scale face-image training data acquisition, preprocessing, cleaning, balancing, and post-processing are disclosed. In some embodiments, the disclosed face-image training data preparation system can receive a raw training dataset containing different types of undesirable face images. The disclosed training data preparation system can then perform cleaning and balancing operations on the raw training dataset to generate a high-quality face-image training dataset free of the undesirable face images. The processed high-quality face-image training dataset can be subsequently used to train deep-neural-network-based face recognition systems to achieve high performance in various face recognition applications. Compared to conventional face recognition systems and techniques, the disclosed training data preparation system and technique provide a fully-automatic, highly-deterministic and high-quality training data preparation procedure which does not rely heavily on assumptions.

In various embodiments, the disclosed face-image training data preparation system includes at least a training dataset cleaning module and a training dataset balancing module, and can optionally include a training dataset preprocessing module and a training dataset post-processing module, all of which can be applied to a raw training dataset of loosely-labeled face images to generate a high-quality training dataset of correctly-labeled face images. In some embodiments, the disclosed training dataset cleaning module is configured to perform the function of face-label verification, i.e., validating if the claimed/labeled identity of a face image is indeed the same person of the claimed/labeled identify (i.e., if the face image has been correctly-labeled). Hence, a labeled face image which fails the identity validation can be removed from the training dataset. However, instead of processing individually-labeled face images independently, the disclosed training dataset cleaning module can process a raw training dataset comprising many groups of identically-labeled face images of a large number of identities or people, by processing each group of identically-labeled face images of each identity/person as a whole.

More specifically, the disclosed training dataset cleaning module can process a group of identically-labeled face images of a given identity by first embedding each image in the group of identically-labeled face images. For example, the disclosed training dataset cleaning module can perform Euclidean embedding (i.e., feature extraction) on each image in a group of identically-labeled face images using a deep neural network, wherein the deep neural network is pre-trained so that a cross product (also referred to as "cosine similarity," "Euclidean distance," and "similarity score" throughout) between two embedded/extracted feature vectors directly corresponds to face similarity between the two corresponding face images. In other words, two face images of the same person would have a greater similarity score between their corresponding feature vectors whereas two face images of two different people would have a smaller similarity score between their corresponding feature vectors. Hence, the disclosed training dataset cleaning module can construct a similarity matrix for the group of images. Once the similarity matrix is constructed, face-label verification for the group of identically-labeled face images can be implemented by applying one or more properly designed thresholds to the similarity scores among the group of identically-labeled face images. Note that when using the above-described Euclidean embedding of the face images as the training data, face recognition becomes a k-NN classification problem, and face clustering can be achieved by using off-the-shelf techniques such as k-means or agglomerative clustering.

Face-Recognition-Model Training-Data-Preparation System

FIG. 1 shows a block diagram of an exemplary face-recognition-model training-data-preparation system 100 in accordance with some embodiments described herein. As can be seen in FIG. 1, training-data-preparation system 100 includes a raw-data-acquisition subsystem 102, a raw-training-dataset-generation subsystem 104, and a high-quality-training-dataset-generation subsystem 106, which are coupled in series in the illustrated order. Although, a face-recognition-model training system 108 is also shown in FIG. 1, face-recognition-model training system 108 merely receives the high-quality training dataset from the disclosed training-data-preparation system 100 as inputs, and is not part of the disclosed training-data-preparation system 100.

In the embodiment shown, raw-data-acquisition subsystem 102 collects a very large set of loosely-labeled images 110 which are labeled with the identities of a large number of people from the public domain, such as the Internet 114, wherein the set of loosely-labeled images 110 is generally "dirty" or "noisy" due to the low-quality nature of the labels associated with these images. Some of the issues associated with the set of loosely-labeled images 110 include, but are not limited to: images labeled with erroneous identities (i.e., an image of one person labeled with the name of another person), images without any faces, and images of very poor qualities (e.g., very small faces or obscured faces). In some embodiments, raw-training-dataset-generation subsystem 104 is configured to receive set of loosely-labeled images 110 and preprocess the set of loosely-labeled images by performing face detections on the set of images. In some embodiments, raw-training-dataset-generation subsystem 104 is also configured to preprocess the detected face images to generate raw training dataset 116 comprising groups of loosely-labeled face images for a large number of people/identities. In some embodiments, high-quality-training-dataset-generation subsystem 106 is configured to receive raw training dataset 116 and perform data cleaning and balancing operations on raw training dataset 116 to generate cleaned and balanced training dataset 118 comprising groups of correctly-labeled face images associated with a group of people. Face-recognition-model-training system 108 can use cleaned and balanced training dataset 118 to train a model training subsystem 120 and a model fine-tuning subsystem 122 and generate a high-performance face recognition model 124 as output. This patent disclosure provides various embodiments for each of the three subsystems 102-106 within training-data-preparation system 100. We now describe each of the subsystems 102-106 in face-recognition-model training-data-preparation system 100 in more detail.

Raw-Data-Acquisition Subsystem

In some embodiments, raw-data-acquisition subsystem 102 is configured to collect a very large set of loosely-labeled images of different people from the public domain, wherein the set of loosely-labeled images is comprised of multiple groups of identically-labeled images such that each group of identically-labeled images is labeled for a unique person. In some embodiments, the labeled images collected by raw-data-acquisition subsystem 102 include mostly images of celebrities and/or famous people. The set of loosely-labeled images collected from the public domain is also referred to as the "original labeled images" or "original images" below.

In some embodiments, raw-data-acquisition subsystem 102 includes an image crawler 112 coupled to the Internet 114. For example, image crawler 112 can be configured to search the images of celebrities through search engines such as Google, Yahoo!, Bing or Baidu.com. In a particular embodiment, raw-data-acquisition subsystem 102 searches both celebrities of Chinese origin and celebrities of other nationalities. For Chinese celebrities, image crawler 112 can search image data through search engines such as Google and Baidu.com using Chinese celebrity names. For celebrities of other nationalities, image crawler 112 can search image data through Google or other popular search engines using the related celebrity names. In some embodiments, image crawler 112 can search the same celebrity using multiple languages of that celebrity's name for the celebrity's images in different countries. After data crawling, the images discovered and downloaded from the Internet 114 can be organized according to the search terms/queries used by image crawler 112, which can include celebrity names, or unique celebrity IDs associated with the celebrity names. Note that a given celebrity can have multiple distinctive names, and/or the same name in various languages. Hence, to uniquely identify the given celebrity, one embodiment assigns each celebrity a unique ID which uniquely identifies the given celebrity. One exemplary system is Microsoft MS-Celeb-1M system. In the MS-Celeb-1M system, a name list is provided, wherein each celebrity is assigned with a unique ID though he/she can have multiple names in various languages. In some embodiments, the size of the labeled images collected by image crawler 112 is in the order of millions to tens of millions, and the number of unique IDs can be in the order of thousands to hundreds of thousands.

In some embodiments, instead of using an image crawler, raw-data-acquisition subsystem 102 can be implemented with other face image data collection techniques. For example, the set of loosely-labeled images 110 can be collected during the course of a human image capturing application, such as through a video surveillance process. As another example, the set of loosely-labeled images 110 can be collected through an image crowd-sourcing process. The set of loosely-labeled images 110 can also be obtained from one or more open source libraries. In some embodiments, raw-data-acquisition subsystem 102 collects the set of loosely-labeled images 110 using multiple of the above-described techniques, e.g., by combining images obtained from the image crawlers and images obtained from open source libraries.

Raw-Training-Dataset-Generation Subsystem

Figure 2:
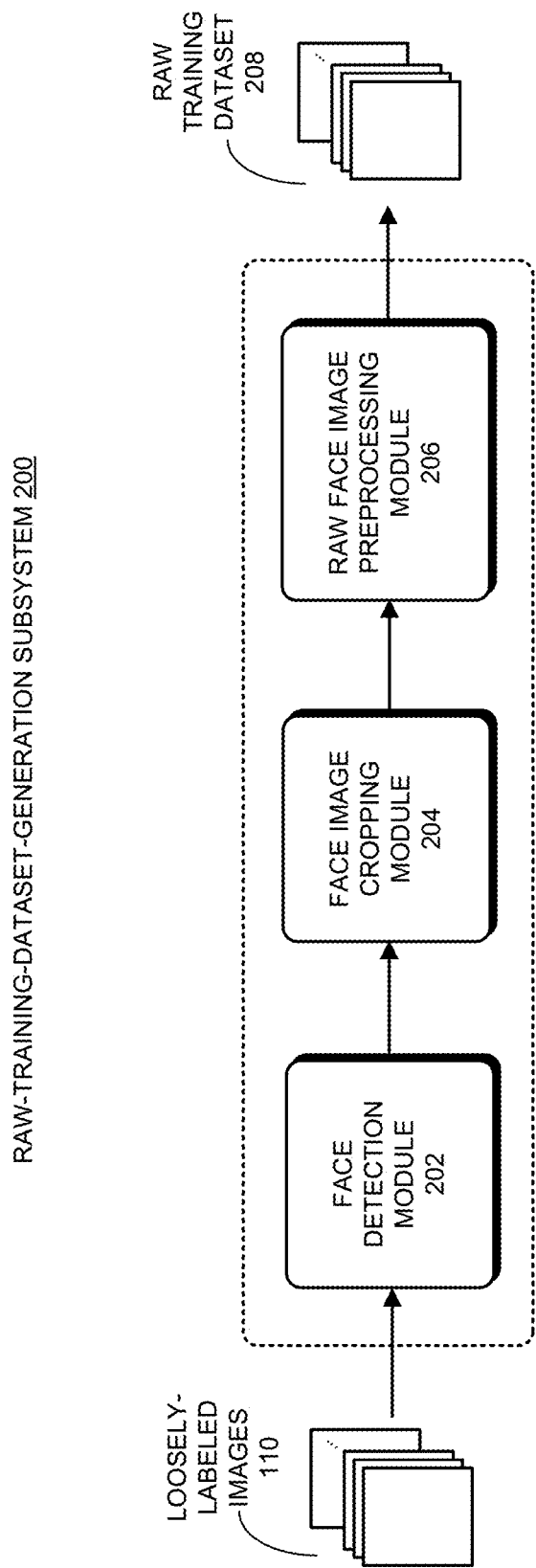
FIG. 2 shows a block diagram of an exemplary implementation of the raw-training-dataset-generation subsystem in the disclosed training-data-preparation system in accordance with some embodiments described herein.

FIG. 2 shows a block diagram of an exemplary implementation 200 of raw-training-dataset-generation subsystem 104 in the disclosed training-data-preparation system 100 in accordance with some embodiments described herein. As can be seen in FIG. 2, raw-training-dataset-generation subsystem 200 includes a face detection module 202, a face image cropping module 204, and a raw face image preprocessing module 206, which are coupled in series in the illustrated order.

In some embodiments, raw-training-dataset-generation subsystem 200 receives the loosely-labeled images 110 of multiple people (e.g., celebrities) from the raw-data-acquisition subsystem 102, wherein loosely-labeled images 110 are organized into groups of identically-labeled images corresponding to the multiple people, and each group of identically-labeled images is labeled with an identity of a unique person, such as a celebrity person.

In some embodiments, for each image within the set of loosely-labeled images 110, face detection module 202 processes the image to detect all the faces within that image. Next, for each processed image, face image cropping module 204 is applied to each detected face within the image to crop out one or more face images. Note that each loosely-labeled image can contain multiple faces, and hence can produce multiple face images. After face detection and face image cropping on a loosely-labeled image, the original set of loosely-labeled images 110 can be discarded. In some embodiments, face detection module 202 is also configured to detect whether there are unusual image formats associated with set of loosely-labeled images 110. If a loosely-labeled image 110 having an unusual image format is detected, this image can be discarded. Moreover, face detection module 202 can also be configured to detect exceptions triggered by set of loosely-labeled images 110, which often indicate corrupted images. If an exception is received while processing a loosely-labeled image 110, this image can be discarded.

In some embodiments, all the faces detected within a given loosely-labeled image 110 are labeled with the same identity as the given loosely-labeled image 110. Moreover, all the face images generated for a group of identically-labeled images in the set of loosely-labeled images 110 can be combined to form a group of identically-labeled face images of a unique person. Note that if a loosely-labeled image does not include a face, this image will not have any contribution to the group of identically-labeled face images. Note also that even though performing face detection and cropping on the identically-labeled images can sometimes identify and remove some of the noisy data, such as those loosely-labeled images without any human faces or with very small faces, the above-described face-image-generation process generally cannot get rid of many other types of defective data, such as incorrectly-labeled faces. In fact, raw-training-dataset-generation subsystem 200 may even create more incorrectly-labeled face images because each incorrectly-labeled original image can produce multiple incorrectly-labeled face images. As such, we refer to the groups of identically-labeled face images generated by raw-training-dataset-generation subsystem 200 as "raw face images."

In some embodiments, when performing face image cropping to generate one or more face images for the one or more detected faces within an image, face image cropping module 204 includes an amount of surrounding areas around a detected face (i.e., the associated bounding box) in the cropped face image so that a sufficient amount of original information (i.e., the background information) for a detected face can be preserved in the cropped face image. For example, when cropping a face image based on a detected bounding box, face image cropping module 204 can include 50% of the margins beyond each edge of the original bounding box associated with the detected face. This cropping technique ensures that the entire face can be safely included within the cropped subimage. More detail of this face cropping technique is provided below.

In some embodiments, face detection module 202 within raw-training-dataset-generation subsystem 200 can employ a convolutional neutral network (CNN)-based face detection framework to perform the intended face detection tasks. For example, face detection module 202 can be implemented with a cascaded CNN framework described in "A Convolutional Neural Network Cascade for Face Detection," H. Li, Z. Lin, X. Shen, J. Brandt, and G. Hua, Proc. IEEE Conf. on Computer Vision and Pattern Recognition, Jun. 1, 2015 or a multitask cascaded CNN framework described in "Joint Face Detection and Alignment Using Multitask Cascaded Convolutional Networks," K. Zhang, Z. Zhang, Z. Li, and Y. Qiao, IEEE Signal Processing Letters, Vol. 23, No. 10, pp. 1499-1503, October 2016. However, face detection module 202 can also be implemented with other now-known or later-developed deep-learning-based face detection frameworks.

After raw face images have been generated from set of loosely-labeled images 110, these raw face images typically have different sizes and the faces within the raw face images can have different positions within the respective images (i.e., not being centered). Moreover, the faces within the raw face images can be rotated in some degree (i.e., not having a front-facing pose). Referring back to the system in FIG. 1, note that the raw training dataset formed by the raw face images including the above-described inconsistencies can be directly sent to high-quality-training-dataset-generation subsystem 106 for data cleaning and balancing operations. However, the above-described inconsistencies in these face images can have negative impact on the effectiveness of high-quality-training-dataset-generation subsystem 106, which in turn can severely degrade performance of face-recognition-model-training system 108 which uses the outputs of high-quality-training-dataset-generation subsystem 106. For example, these deficiencies in raw face images can directly affect the result of raw training data cleaning operation because effectiveness of the cleaning operation relies upon the quality of the raw face images.

In some embodiments, prior to performing raw training dataset cleaning and balancing, the raw face images are first preprocessed by raw face image preprocessing module 206. More specifically, raw face image preprocessing module 206 resizes and centers each of the raw face images generated by face image cropping module 204 so that the preprocessed face images all have the same image size and the faces within the preprocessed images are all substantially centered. In some embodiments, raw face image preprocessing module 206 also performs face rotations on the raw face images so that the faces in the preprocessed face images all have substantially a front-facing pose. Note that if the raw face images include the above-described margins on all sides added during the face cropping, then the faces within the cropped images are already substantially centered. Consequently, when the margins have been included in the cropped face images, centering operation during the face image preprocessing can be optional. In some embodiments, the face cropping operation with additional margins can be used for face centering. In such embodiments, the face cropping operation by face image cropping module 204 can be part of the overall raw face image preprocessing process. After applying the above-described face-image-preprocessing operations, the preprocessed face images form a raw training dataset 208 (i.e., raw training dataset 116 as in FIG. 1), which can then be processed by high-quality-training-dataset-generation subsystem 106.

Figure 3:
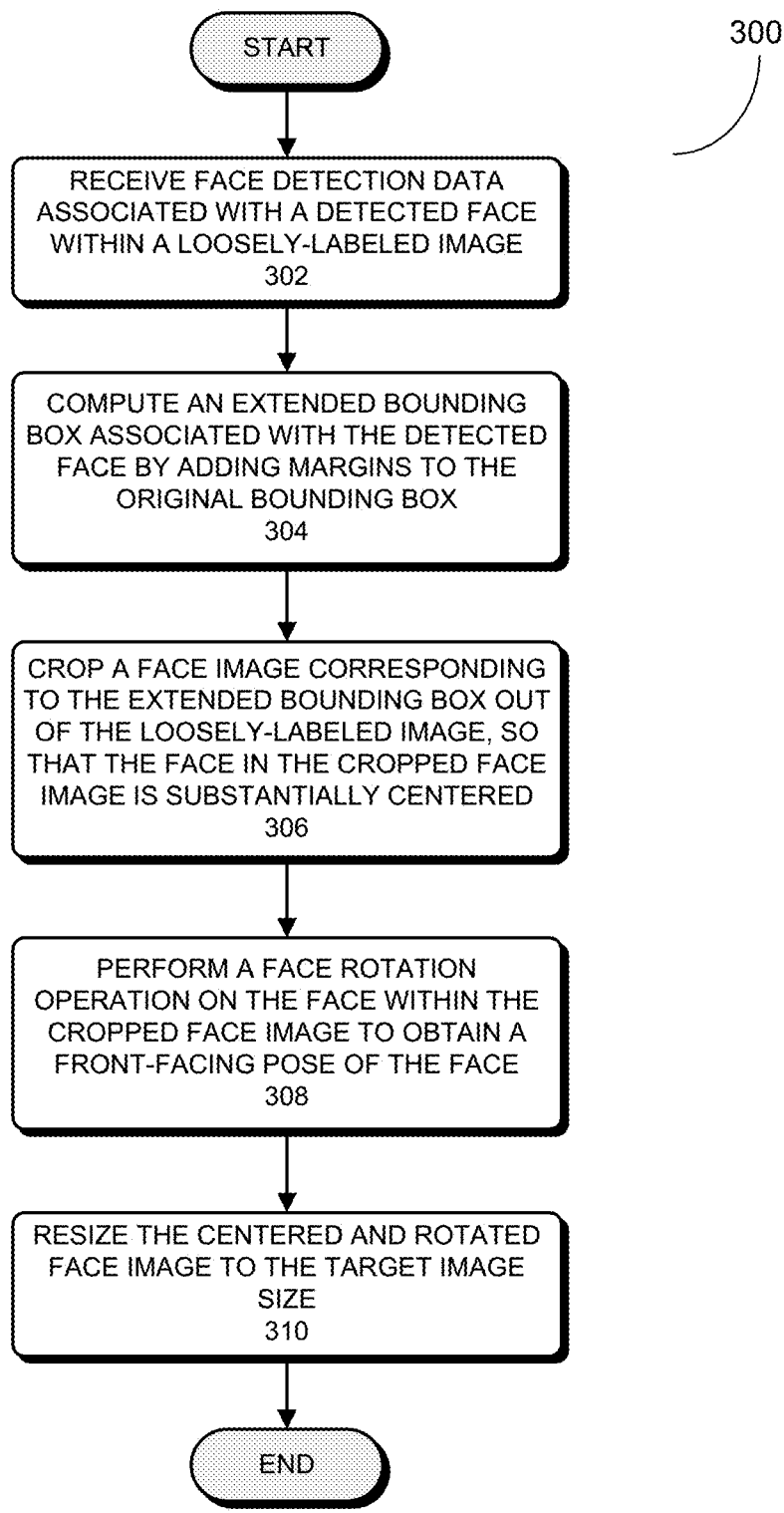
FIG. 3 presents a flowchart illustrating an exemplary process for preprocessing raw face images in combination with the face cropping operation in accordance with some embodiments described herein.

FIG. 3 presents a flowchart illustrating an exemplary process 300 for preprocessing raw face images in combination with the face cropping operation in accordance with some embodiments described herein.

The process 300 may begin by receiving face detection data associated with a detected face within a loosely-labeled image (step 302). For example, the face detection data can include both determined bounding box locations and face landmark locations of the detected face. The process can additionally receive a margin ratio r, and a target image size ($s_1$, $s_2$). The process then computes an extended bounding box associated with the detected face by adding margins to the original bounding box (step 304). In a particular example, the process first obtains the original bounding box information which includes the coordinates of top left corner (x, y) or another corner of the bounding box, as well as the width and height of the original bounding box, w and h. The process subsequently computes the positions for an extended bounding box by using the following expressions:

$$x'=x-(w\times r)/2; y'=y-(h\times r)/2; \text{ and}$$

$$w'=w+(w\times r); h'=h+(h\times r),$$

wherein (x', y') is the location of the top left corner of the extended bounding box, and w' and h' are the width and height of the extended bounding box, respectively.

The process subsequently crops a face image corresponding to the extended bounding box out of the loosely-labeled image, so that the detected face within the cropped face image is substantially centered (step 306). In some embodiments, if a detected face is positioned near an edge of the original image, the original image may not have sufficient margins to be added to one or more sides of the determined bounding box of the detected face. In such cases, one or more artificial margins of the intended sizes (e.g., based on the above equations) may need to be generated and patched onto the cropped face image, so that the detected face is substantially centered within the raw face image.

After the face image has been cropped out based on the extended bounding box, the process then performs a face rotation operation on the face within the cropped face image so that the rotated face has a substantially front-face pose (step 308). For example, the process can identify positions of the two eyes based on the determined face landmark locations, and subsequently rotate the face image so that the line connecting the left eye and right eye becomes horizontal. Next, the process resizes the centered and rotated face image to the target image size ($s_1$, $s_2$) (step 310). In one example, the input target size is (160, 160) and the input margin ratio is between 20/140 and 30/140. In some embodiments, the rotation and resizing steps 308 and 310 in process 300 may be reversed.

In some embodiments, preprocessing raw faces images can include fewer than the above-described steps. For example, some embodiments may only require resizing and centering the raw face images without the face rotation and without providing additional margins. In some embodiments, only image resizing of the raw face images is required without the face centering, face rotation, and adding additional margins. In still other embodiments, no preprocessing of the raw face images is required before performing raw training dataset cleaning and balancing. However, in these embodiments, post-processing of the remaining face images would be required after performing training dataset cleaning and balancing operations on the raw training dataset 208.

High-Quality-Training-Dataset-Generation Subsystem

As mentioned above, high-quality-training-dataset-generation subsystem 106 receives raw training dataset 116 comprising groups of identically-labeled face images from raw-training-dataset-generation subsystem 104, wherein each group of identically-labeled face images can include hundreds to thousands of face images labeled with a unique identity of the same person. These groups of identically-labeled face images, which can contain tens of thousands of unique identities from the original loosely-labeled images 110, form a raw training dataset for a face recognition model. However, each group of identically-labeled face images typically contains incorrectly-labeled images, which are considered as "noisy data" within the raw training dataset. Moreover, different groups of identically-labeled face images often contain different numbers of face images, and these differences among different groups of face images can vary wildly, thereby causing "imbalance" within the raw training dataset. In some embodiments, high-quality-training-dataset-generation subsystem 106 is configured to perform various disclosed data cleaning and balancing operations on the groups of identically-labeled face images within raw training dataset 116 to generate cleaned and balanced training dataset 118 for face-recognition-model training system 108.

Figure 4:
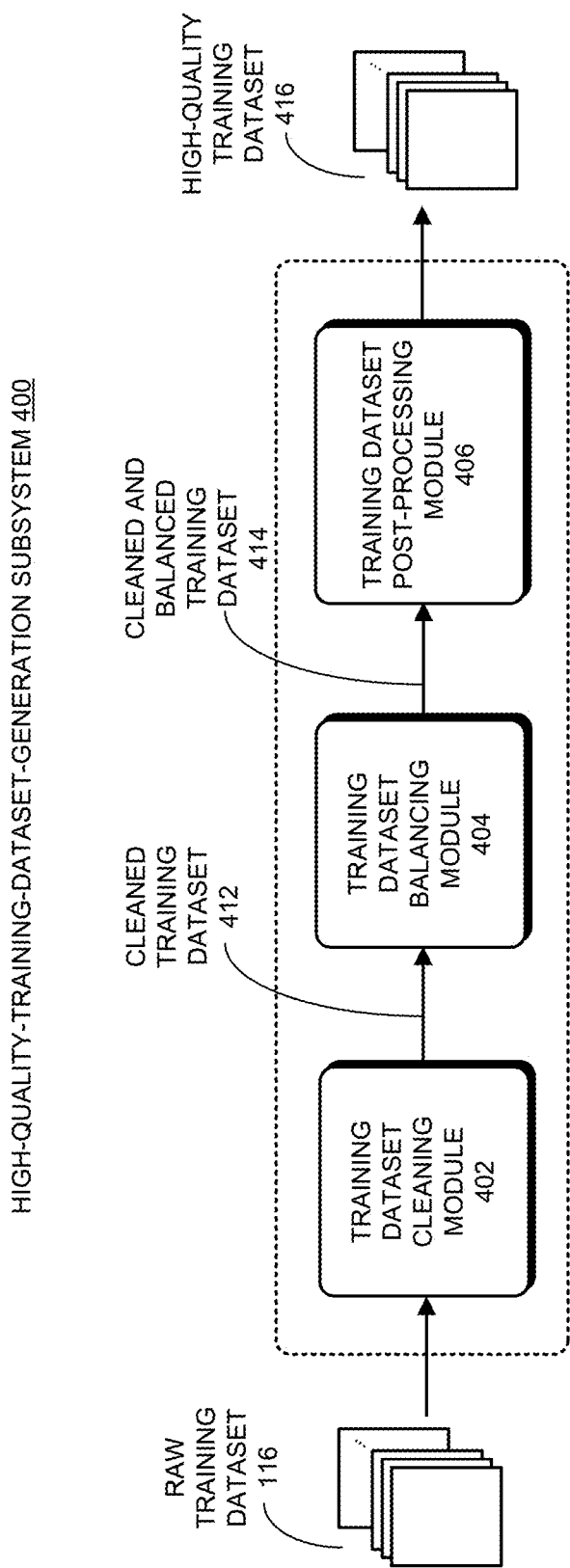
FIG. 4 shows a block diagram of an exemplary implementation of the high-quality-training-dataset-generation subsystem in the disclosed training-data-preparation system in accordance with some embodiments described herein.

FIG. 4 shows a block diagram of an exemplary implementation 400 of high-quality-training-dataset-generation subsystem 106 in the disclosed training-data-preparation system 100 in accordance with some embodiments described herein. As can be seen in FIG. 4, high-quality-training-dataset-generation subsystem 400 includes a training dataset cleaning module 402, a training dataset balancing module 404, and a training dataset post-processing module 406, which are coupled in series in the order shown. In some embodiments, training dataset cleaning module 402 receives raw training dataset 116 comprising many groups of identically-labeled face images of multiple people as inputs, and generates cleaned training dataset 412 as outputs. Training dataset balancing module 404 receives cleaned training dataset 412 as inputs, and generates cleaned and balanced training dataset 414 as outputs. In some embodiments, training dataset post-processing module 406 receives cleaned and balanced training dataset 414 as inputs, performs additional face alignments and margin correction operations on the received face images, and outputs high-quality training dataset 416 (i.e., high-quality training dataset 118 as in FIG. 1) comprising groups of cleaned and balanced face images, wherein each group includes a set of standardized face images of the same size, and faces that are substantially centered and have substantially the same alignments. We now describe each of training dataset cleaning module 402, training dataset balancing module 404, and training dataset post-processing module 406 in more detail below.

Multistage Training Dataset Cleaning

As described above, raw training dataset 116 are organized into multiple groups of identically-labeled face images corresponding to multiple identities, with each group of identically-labeled face images labeled with the same identity, and any two groups of face images having two different identities. For each group of identically-labeled face images, training dataset cleaning module 402 is configured to perform a data cleaning operation to identify a subset of images in the group of face images which are "noisy" or "dirty," e.g., being incorrectly-labeled and/or having very poor image quality. The disclosed data cleaning technique for raw training dataset 116 includes an iterative operation which repeats a common data cleaning procedure for each and every group of identically-labeled face images. In other words, the disclosed data cleaning technique typically operates on one group of identically-labeled face images of the same identity at a time instead of operating on multiple groups of identically-labeled face images as a whole. However, the disclosed data cleaning technique can also be modified to perform parallel-processing on multiple groups of identically-labeled face images at the same time.

Subsequently, training dataset cleaning module 402 outputs cleaned groups of identically-labeled face images without the "noisy" or "dirty" images in each group of identically-labeled face images. In some embodiments, cleaning raw training dataset 116 can be viewed as a binary classification problem. One disclosed data cleaning technique is based on using pre-trained face recognition models to extract highly-reliable identity-discriminative features and then separating noisy data from clean data within raw training dataset 116 by applying a disclosed multistage data-cleaning framework to the raw training dataset.

Figure 5:
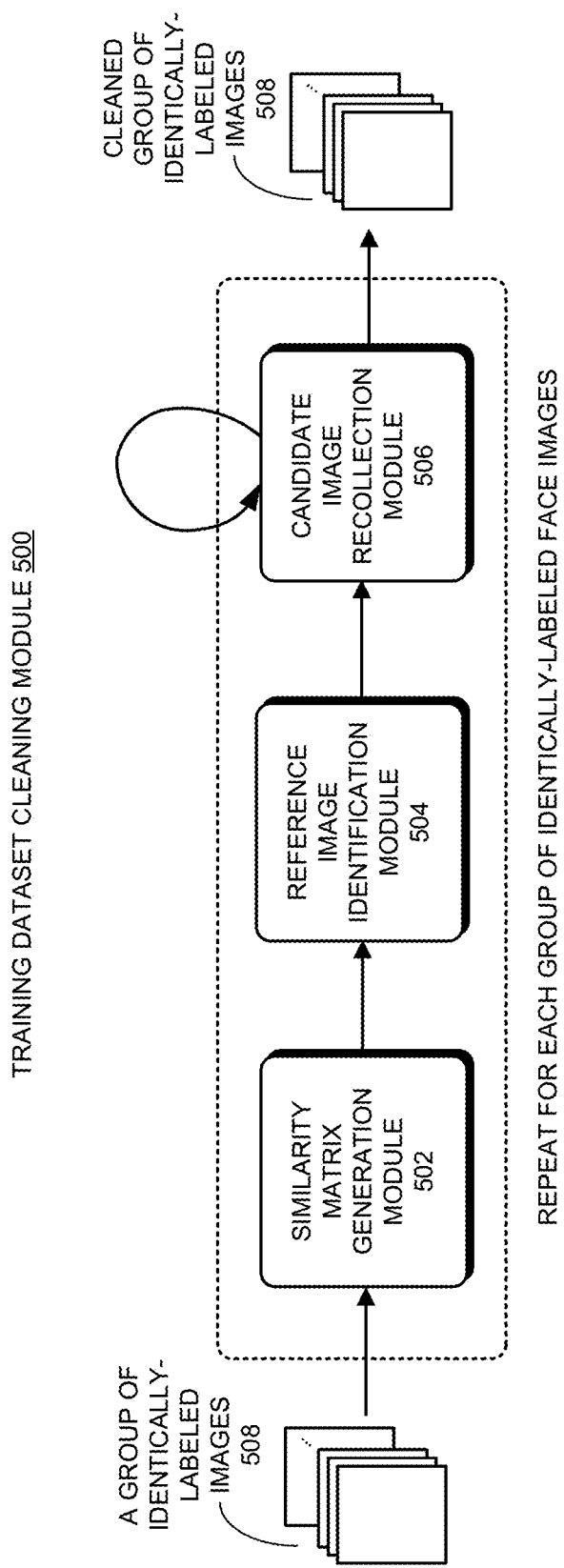
FIG. 5 shows a block diagram of an exemplary implementation of the data cleaning module in the disclosed high-quality-training-dataset-generation subsystem in accordance with some embodiments described herein.

FIG. 5 shows a block diagram of an exemplary implementation 500 of data cleaning module 402 in the disclosed high-quality-training-dataset-generation subsystem 400 in accordance with some embodiments described herein. As discussed above, the disclosed data cleaning technique is an iterative operation which is repeated on each group of identically-labeled face images within raw training dataset 116, wherein data cleaning operations on different groups of identically-labeled face images are generally independent from one another. Hence, while various exemplary implementations of data cleaning module 500 are provided below for performing data cleaning on a single group of identically-labeled face images, the disclosed implementations are equally applicable to all groups of identically-labeled face images. Note that the iterative process of data cleaning module 500 on multiple groups of identically-labeled face images is indicated in FIG. 5 with a dotted box enclosing the various modules of data cleaning module 500.

As can be seen in FIG. 5, data cleaning module 500 includes a similarity matrix generation module 502, a reference image identification module 504, and a candidate image recollection module 506, which are coupled in series in the order shown. Moreover, similarity matrix generation module 502 receives a group of identically-labeled face images 508 of the same person/identity among the groups of identically-labeled face images within raw training dataset 116. In some embodiments, similarity matrix generation module 502 is configured to extract highly-reliable identity-discriminative feature vectors for the group of identically-labeled face images 508 and subsequently generate a similarity matrix for the group of identically-labeled face images 508 based on the determined feature vectors.

In some embodiments, reference image identification module 504 is configured to identify a subset of images within the group of identically-labeled face images 508 wherein each image in the identified subset of images has a very high probability to have the intended identity, i.e., to have been correctly labeled. The identified subset of images is designated as a reference image set (i.e., the ground truth) for identifying additional images in the group of identically-labeled face images 508 which have also been correctly labeled. In some embodiments, candidate image recollection module 506 is configured to compare the rest of the images in the group of identically-labeled face images 508 against the reference image set to identify additional correctly-labeled images in the group of identically-labeled face images 508 and to allow the identified images to be recollected. Note that after more images have been recollected, the reference image set can be expanded by including the recollected images, and the recollection operation performed by candidate image recollection module 506 can be repeated. This repetition procedure is indicated in FIG. 5 as a loop starting from and ending onto candidate image recollection module 506. Finally, candidate image recollection module 506 outputs the cleaned group of identically-labeled face images 510 without the incorrectly-labeled and very low-quality face images.

Figure 6:
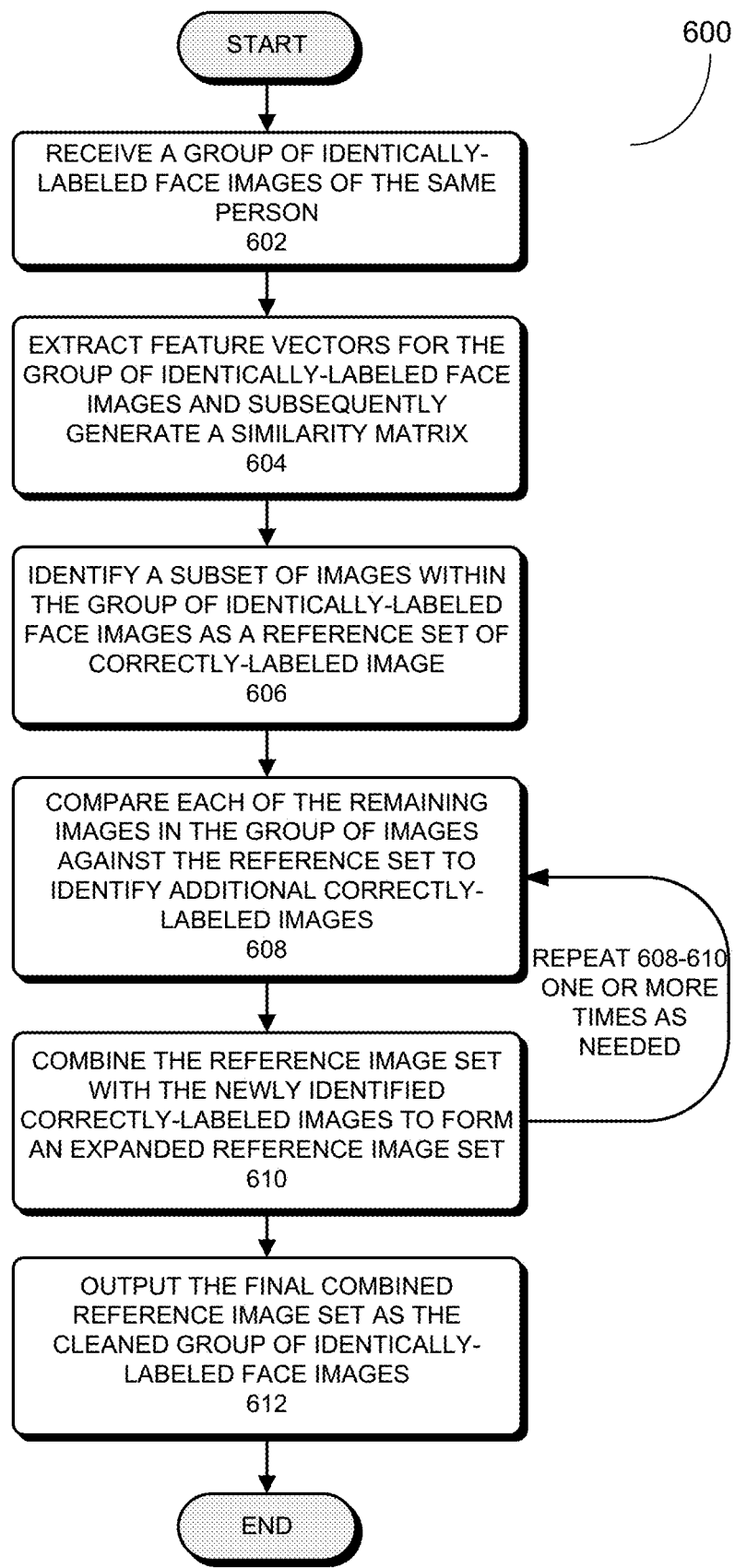
FIG. 6 presents a flowchart illustrating an exemplary process for performing data cleaning using the disclosed data cleaning module in accordance with some embodiments described herein.

FIG. 6 presents a flowchart illustrating an exemplary process 600 for performing data cleaning using the disclosed data cleaning module 500 in accordance with some embodiments described herein. The process 600 may begin by receiving a group of identically-labeled face images of the same person/identity among the groups of identically-labeled face images (step 602). The process then extracts feature vectors for the group of identically-labeled face images and subsequently generates a similarity matrix for the group of identically-labeled face images based on the determined feature vectors (step 604). The process next identifies a subset of images within the group of identically-labeled face images as a reference set of correctly-labeled images (step 606). The process then compares each of the remaining images (i.e., images not in the reference set) in the group of identically-labeled face images against the reference image set to identify additional correctly-labeled images in the group of identically-labeled face images (step 608). Next, the process combines the reference image set with the newly identified correctly-labeled images to form an expanded reference image set (step 610). At this point, the process can choose to repeat steps 608 and 610 one or more times to recollect additional correctly-labeled images. Eventually, the process outputs the final combined reference image set as the cleaned group of identically-labeled face images of the input group of identically-labeled face images. Moreover, steps 602-612 are also repeated for different groups of identically-labeled face images of the raw training dataset 116 to clean the entire raw training dataset 116. We now describe in more detail the different modules within data cleaning module 500 below.

Similarity Matrix Generation Module

In some embodiments, for each image in the group of identically-labeled images 508, a pre-trained face embedding model is used to generate a feature vector for the image. For example, the pre-trained face embedding model may include a VGGNet face recognition model trained based on the data from ImageNet. However, other deep learning frameworks for face recognition applications can be used in place of VGGNet, e.g., ResNet, DenseNet, Dual Pathway Network, MobileNet or Inception v1-v3, and the training dataset used to train a given module can be other than the ImageNet. In some embodiments, a pre-trained face embedding model uses standard facial features in each of the neural network layers. The extracted feature vector for each input face image can have a format in accordance with the pre-trained face embedding model, e.g., as a 1D feature vector of 1024 dimensions (or 2048 or 4096 dimensions in some other embodiments). The extracted feature vectors of visually similar faces will be close to each other in the 1024-dimensional (or 2048 or 4096 dimensions in some other embodiments) space in terms of the associated Euclidean distance.

After computing the feature vectors for the images within the group of identically-labeled images, a similarity score can be computed for each pair of the images in the group of identically labeled images. For example, a similarity score between a pair of images can be computed as a Euclidean distance (i.e., cosine product) between the two extracted feature vectors of the pair of images, which indicates a degree of similarity between the two images. In some embodiments, the similarity score is between −1 and 1, wherein a higher score means a higher probability that the two corresponding images belong to the same person/identity. Note that the computed similarity scores for the group of identically-labeled images can be used to form an N×N similarity matrix for the group of N images, wherein each element in the similarity matrix is a similarity score between a pair of images within the group of N images. Note that each diagonal element within the similarity matrix would have the value of 1 because it represents the similarity of each image with itself.

Reference Image Identification Module

In some embodiments, reference image identification module 504 is configured to apply a first threshold $t_1$ to the similarity matrix to separate the elements within the similarity matrix into two sets: a first set of elements greater than or equal to $t_1$ and a second set of elements smaller than $t_1$. For example, similarity scores of 1.0 would fall into the first set of elements. In some embodiments, the first threshold value $t_1$ can be determined such that the probability that two images having a similarity score greater than or equal to $t_1$ but do not have the same identity is below a predetermining value. Hence, this predetermined value can be considered as a user-defined error rate, which can be customized by the user. For example, the user-defined error rate can be set to 0.001 or 0.0001. Once the error rate is set, the first threshold value $t_1$ can be experimentally determined with a set of correctly-labeled images of the same person. It can be understood that the threshold value $t_1$ is higher if the user-defined error rate is lower. In one embodiment, the first threshold value $t_1$ is set to 0.75 to achieve an acceptable error rate.

It is reasonable to assume that a subset of highly similar images in the group of identically-labeled images can be identified from the first set of elements after applying the first threshold value $t_1$. Moreover, highly similar images in the group of identically-labeled images also have high likelihoods of being correctly labeled with the intended identity. However, it is also possible that a subset of highly similar images in the group of identically-labeled images does not belong to the intended identity (but a different identity). Hence, a design objective of reference image identification module 504 is to identify a subset of highly similar images in the group of identically-labeled images 508 which actually belongs to the intended identity, i.e., correctly-labeled as the person of the intended identity. As described above, the subset of identified images can be used as a reference set of correctly-labeled images (i.e., the ground truth) for searching for other correctly-labeled images in the group of identically-labeled images.

Figure 7:
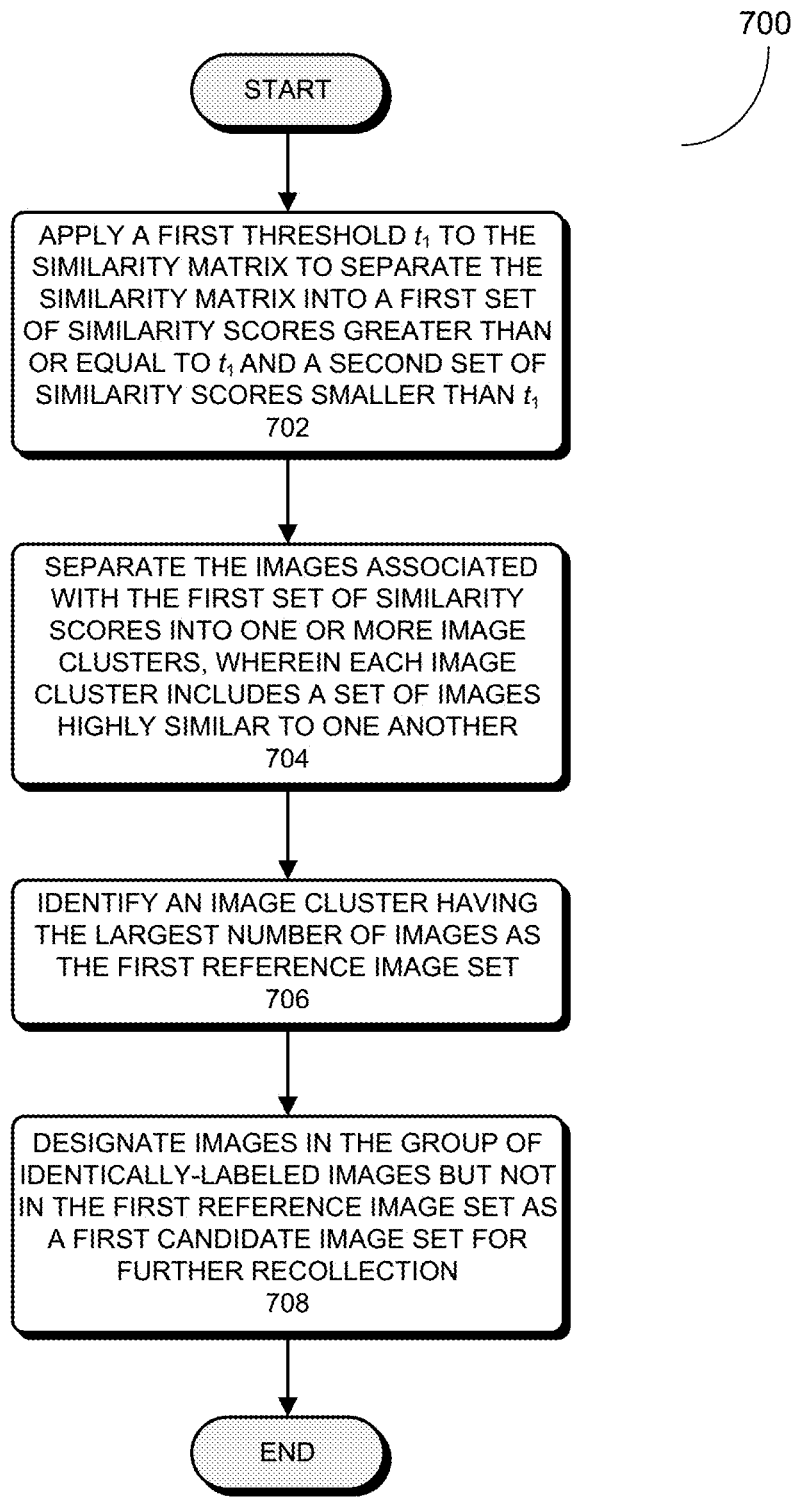
FIG. 7 presents a flowchart illustrating an exemplary process for identifying a reference image set in the group of identically-labeled images in accordance with some embodiments described herein.

FIG. 7 presents a flowchart illustrating an exemplary process 700 for identifying a reference image set in the group of identically-labeled images in accordance with some embodiments described herein.

The process 700 may begin by applying a first threshold $t_1$ to the similarity matrix to separate the elements within the similarity matrix into a first set of similarity scores greater than or equal to $t_1$ and a second set of similarity scores smaller than $t_1$ (step 702). One exemplary technique for determining the value of $t_1$ has been provided above. The process then separates the images associated with the first set of similarity scores into one or more image clusters, wherein each image cluster includes a subset of images within the group of identically-labeled images which are highly similar to one another (step 704). In some embodiments, images which are highly similar to one another based on their mutual similarity scores can be aggregated into the same image cluster. Hence, for a given image cluster generated during step 704, any two images in the given cluster has an associated similarity score greater than or equal to the first threshold $t_1$. Moreover, if step 704 generates two or more image clusters for the images associated with the first set of similarity scores, then it is reasonable to assume that a given image $I_A$ in a first cluster A has a similarity score lower than $t_1$ when compared to any image in a second cluster B, and a given image $I_B$ in the second cluster B has a similarity score lower than $t_1$ when compared to any image in the first cluster A. In other words, it is unlikely that an image associated with the first set of similarity scores will be categorized into two different image clusters during step 704.

In some embodiments, separating the images associated with the first set of similarity scores into one or more image clusters involves building one or more connected graphs based on the first set of similarity scores. For example, to build a given connected graph, a new vertex and a new node can be created for an existing node (i.e., image) for a similarity score between the old node and the new node in the first set of similarity scores.

After the images associated with the first set of similarity scores have been separated into one or more images clusters, the process identifies an image cluster within the one or more image clusters that has the largest number of images among the one or more image clusters and designates this identified image cluster as the first reference image set (i.e., as the ground truth) (step 706). It is reasonable to assume that all images within this largest image cluster are correctly labeled with the intended identity. In fact, even if step 706 generates more than one image cluster, it can be reasonably predicted that one of the image clusters includes significantly more images than any other image clusters. This is because, as discussed above, the images in the first reference image set have the highest probability to have been correctly-labeled with the intended identity. The process further designates images in the group of identically-labeled images but not in the first reference image set as a first candidate image set for further recollection (step 708). Note that the images in the first candidate image set include both images associated with the first set of similarity scores (but not in the largest image cluster) and images associated with the second set of similarity scores.

Note that a special case for the above-described process 700 is that all of the images associated with the first set of similarity scores are aggregated into the same image cluster. In this scenario, all of the images associated with the first set of similarity scores become the first reference image set whereas all of the images associated with the second set of similarity scores become the first candidate image set.

Note that because the first threshold $t_1$ is set in such a manner (i.e., of a very high value) to ensure that the images in the first reference image set have very high probabilities to be correctly labeled, the tradeoff is that the first reference image set may have excluded some images from the group of identically-labeled images which are also correctly labeled. Hence, it becomes necessary to also identify those images in the first candidate image set which have the corrected identity, and to combine these images with the first reference image set to form a bigger training dataset for the intended identity. In other words, mechanism is needed to recollect those correctly-labeled images from the first candidate image set.

Candidate Image Recollection Module

Figure 8:
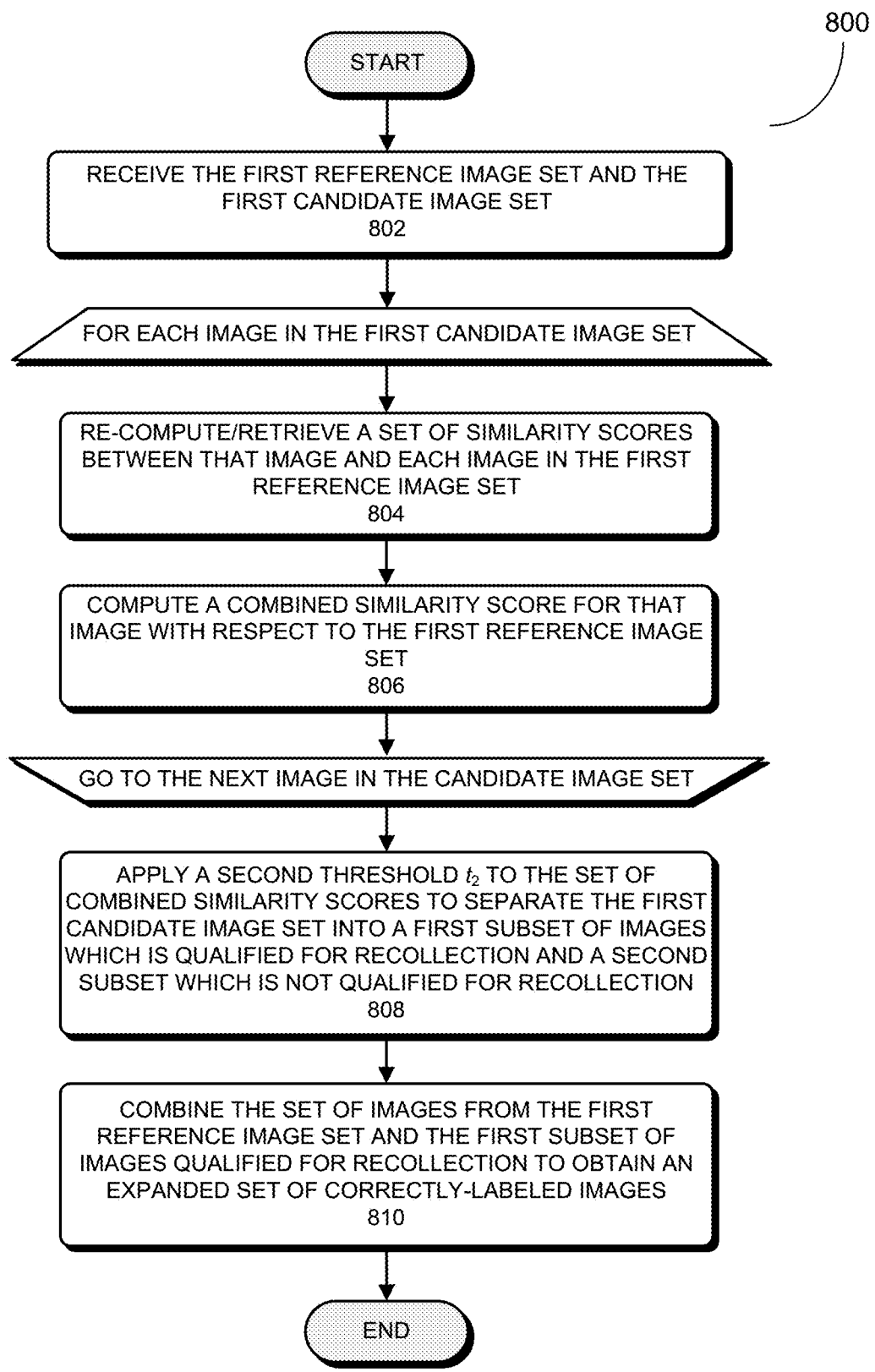
FIG. 8 presents a flowchart illustrating an exemplary process for identifying a subset of images in the first candidate image set which are also correctly labeled in accordance with some embodiments described herein.

FIG. 8 presents a flowchart illustrating an exemplary process 800 for identifying a subset of images in the first candidate image set which are also correctly labeled in accordance with some embodiments described herein.

The process 800 may begin by receiving the first reference image set and the first candidate image set (step 802). Next, for a given image in the first candidate image set, the process (1) re-computes or retrieves (i.e., from the previously computed similarity matrix) a set of similarity scores between the given image and each image in the first reference image set (step 804); and (2) computes a combined similarity score for the given image with respect to the first reference image set (step 806). Note that because every image within the first reference image set is believed to have the correct identity, a high value in the combined similarity score for a given image in the first candidate image set with respect to the entire first reference image set provides a very high confidence and reliability that this given image also has the correct identity. In some embodiments, the process computes the combined similarity score of the given image with respect to the first reference set by computing a weighted average of the set of computed similarity scores. In a particular embodiment, the process computes the set of weights by providing a higher weight value to a larger similarity score in the set of computed similarity scores. For example, for a computed similarity score s in the set of similarity scores, the weight value associated with similarity score s within the weighted average can be determined based on a factor $\exp(r \cdot s)$, wherein r is a positive number between 2 and 10, and preferably between 3 and 5. In other embodiments, the combined similarity score can be computed as a non-weighted average of the set of computed similar scores.

Note that steps 804-806 are repeated for each and every image in the first candidate image set to generate a set of combined similarity scores for the first candidate image set. Next, the process applies a second threshold $t_2$ to the set of combined similarity scores computed for the first candidate image set to separate the first candidate image set into a first subset of images which is qualified for recollection and a second subset of images which is not qualified for recollection (step 808). In some embodiments, the second threshold value $t_2$ can be determined in a similar manner as the determination of $t_1$ described above, i.e., based on a user-defined error rate. More specifically, threshold value $t_2$ can be determined such that the probability that an image having a combined similarity score (with respect to the first reference set) greater than or equal to $t_2$ but does not have the same identity as the set of reference images is below the user-defined error rate. For example, the user-defined error rate can be set to 0.001 or 0.0001. Once the error rate is set, the second threshold value $t_2$ can be experimentally determined. It can be understood that the threshold value $t_2$ is higher if the user-defined error rate is lower. In one embodiment, the value of $t_2$ is set between 0.4-0.65 to achieve an acceptable error rate. Generally, the second threshold $t_2$ is smaller than the first threshold $t_1$ This is reasonable because the second threshold $t_2$ is used to gauge a combined similarity score which is computed against a large number of correctly-labeled images, whereas the first threshold $t_1$ is used to gauge a single similarity score which is computed between two images.

After identifying additional qualified (i.e., correctly-labeled) images, the process subsequently combines the set of images from the first reference image set and the first subset of images in the first candidate image set determined to be qualified for recollection to obtain an expanded set of correctly-labeled images of the intended identity (step 810). In some embodiments, the second subset of images in the first candidate image set not qualified for recollection can be discarded.

In some embodiments, the expanded set of correctly-labeled images of the intended identity becomes a second reference image set (i.e., the new ground truth) whereas the remaining images in the group of identically-labeled images (i.e., the second subset of images not qualified for recollection as descried-above) become a second candidate image set for additional recollection actions if needed.

Figure 9:
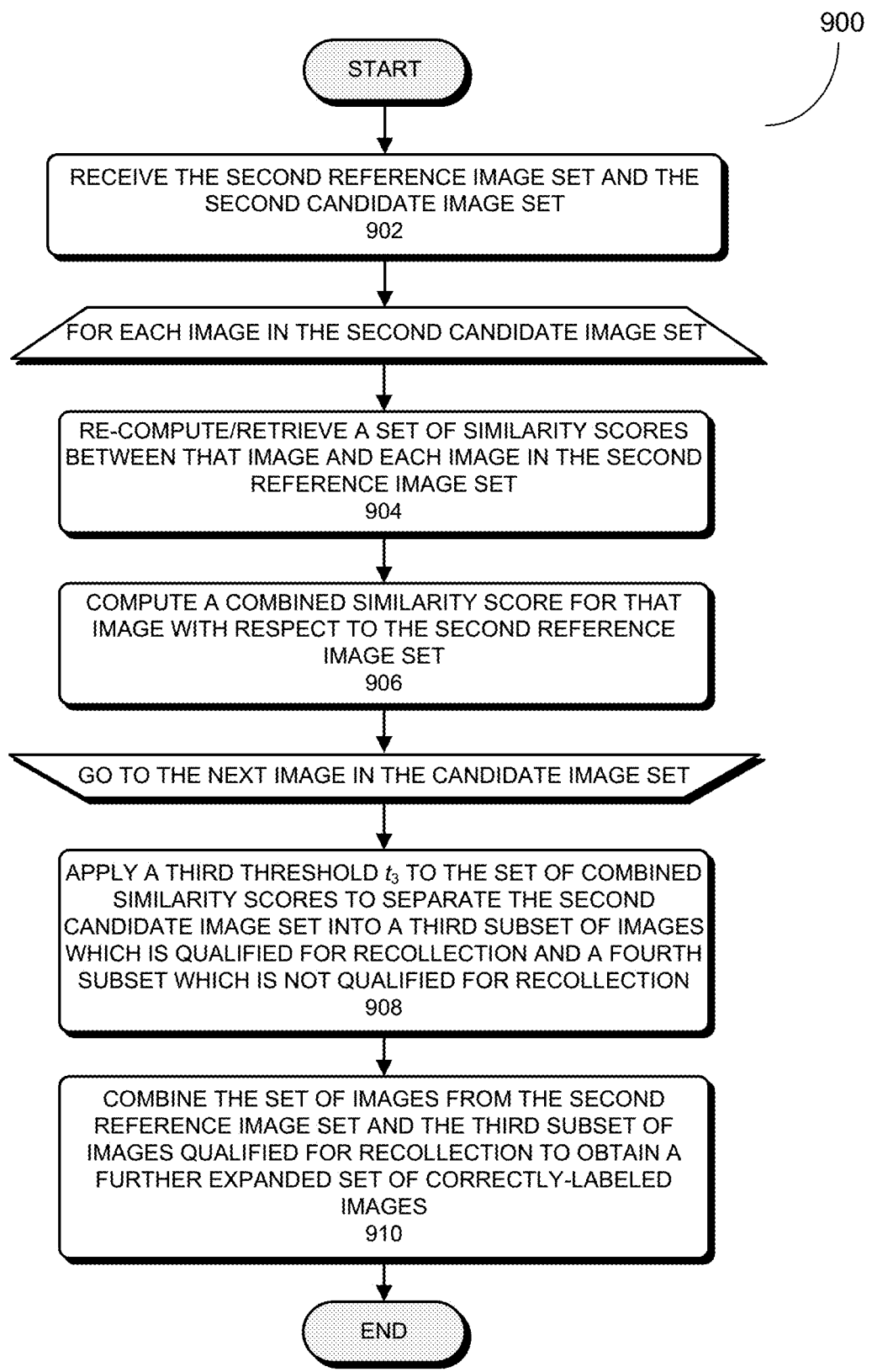
FIG. 9 presents a flowchart illustrating an exemplary process for identifying a subset of images in the second candidate image set which are also correctly labeled in accordance with some embodiments described herein.

FIG. 9 presents a flowchart illustrating an exemplary process 900 for identifying a subset of images in the second candidate image set which are also correctly labeled in accordance with some embodiments described herein.

The process 900 may begin by receiving the second reference image set and the second candidate image set (step 902). Next, for a given image in the second candidate image set, the process (1) re-computes or retrieves (i.e., from the previously computed similarity matrix) a set of similarity scores between the given image and each image in the second reference image set (step 904); and (2) computes a combined similarity score for the given image with respect to the second reference image set (step 906). Note that because every image within the second reference image set is believed to have the correct identity, a high value in combined similarity score for a given image in the second candidate image set with respect to the entire second reference image set provides a very high confidence and reliability that this given image also has the correct identity. In some embodiments, the process computes the combined similarity score of the image with respect to the second reference set by computing a weighted average of the set of computed similarity scores. In a particular embodiment, the process computes the set of weights by providing a higher weight value to a larger similarity score in the set of computed similarity scores. For example, for a computed similarity score s in the set of similarity scores, the weight value associated with similarity score s within the weighted average can be determined based on a factor $\exp(r \cdot s)$, wherein r is a positive number between 2 and 10, and preferably between 3 and 5. In other embodiments, the combined similarity score can be computed as a non-weighted average of the set of computed similar scores.

Note that steps 904-906 are repeated for each and every image in the second candidate image set to generate a set of combined similarity scores for the second candidate image set. Next, the process applies a third threshold $t_3$ to the set of combined similarity scores computed for the second candidate image set to separate the second candidate image set into a third subset of images which is qualified for recollection and a fourth subset of images which is not qualified for recollection (step 908). In some embodiments, the third threshold value $t_3$ can be determined in a similar manner as the determinations of $t_1$ and $t_2$ described above. Generally, the third threshold $t_3$ is smaller than the second threshold $t_2$, which itself is smaller than the first threshold $t_1$. This is reasonable because the third threshold $t_3$ is used to gauge a combined similarity score which is computed against a larger number of correctly-labeled images than the number of correctly-labeled images used to compute the combined similarity score associated with the second threshold $t_2$. After identifying additional qualified (i.e., correctly-labeled) images, the process subsequently combines the set of images from the expanded set of correctly-labeled images and the third subset of images in the second candidate image set determined to be qualified for recollection to obtain a further expanded set of correctly-labeled images of the intended identity (step 910). In some embodiments, the fourth subset of images in the second candidate image set not qualified for recollection can be discarded.

The above-described process of recollecting additional correctly-labeled images from remaining images includes two repetitions of a similar recollection procedure (i.e., a single loop as shown in the loop in FIG. 6). If necessary (e.g., in order to create a larger training dataset), the above-described recollection procedure can be repeated even more times (i.e., two or more repetitions of steps 608-610 as shown in FIG. 6). Eventually, a cleaned group of identically-labeled images can be obtained by combining the first reference image set with the recollected images generated from each and every repetition of the recollection operation. As illustrated in FIG. 5, the above-described processes (including the processes in conjunction with FIGS. 6-9) for cleaning a single group of identically-labeled face images is also repeated for different groups of identically-label face images of different identities/people, thereby generating a cleaned training dataset 508 as shown in FIG. 5.

Note that the above-described process of recollecting additional correctly-labeled images constructs a candidate image set (e.g., the first candidate image set or the second candidate image set) using the remaining images in the group of identically-label face images, i.e., those face images which are not in the current reference image set. Mathematically, if a group of identically-label face images can be expressed as a set S and the current reference image set is a set $S_1$ (e.g., the first reference image set or the second reference image set), then $S=S_1+S_2$, wherein set $S_2$ is the remaining images in set S. In some embodiments described above, the candidate image set (e.g., the first candidate image set or the second candidate image set) is constructed with set $S_2$ (i.e., images not in the current reference image set $S_1$), which is subsequently recollected by comparing each image in set $S_2$ against reference set $S_1$. In a variation to these embodiments, a candidate image set (e.g., the first candidate image set or the second candidate image set) can be constructed with the entire group of identically-label face images, i.e., set S. More specifically, after the reference image set $S_1$ is first identified or later updated, the new candidate image set remains to be the complete set S. Hence, for each recollection operation, the complete set S is recollected by comparing each image in set S against the current reference set $S_1$. In other words, in these embodiments, when reference image set $S_1$ is first created and then updated in each recollection operation/procedure, the candidate image set for each recollection operation remains unchanged as the entire group of identically-label face images. Note that one consequence of using the entire set S as the candidate image set for recollection is that, for each recollection operation/procedure, while additional correctly-labeled images can be identified and recollected into the cleaned group of identically-labeled images, it is also possible that some images in the current reference image set $S_1$ are found to be suboptimal for a given threshold and subsequently removed from the reference image set $S_1$ and eventually from the final cleaned group of identically-labeled images. In contrast, when the candidate image set is constructed with remaining images $S_2$ such as in some embodiments described in conjunction with FIGS. 6-9, a recollection operation/procedure typically does not cause any image in the current reference image set (including the first reference image set and later recollected images) to be removed from the cleaned group of identically-labeled images as a result of a recollection operation.

Training Dataset Balancing Module

Referring back to FIG. 4, note that the disclosed high-quality-training-dataset-generation subsystem 400 also includes a training dataset balancing module 404 following training dataset cleaning module 402. As described above, cleaned training dataset 412 output from training dataset cleaning module 402 is typically unbalanced. For example, some identities/people can have 500 or more face images while some other identities/people have no more than 50 face images. When training a deep neural network with the softmax loss, the unbalanced training dataset can bias the prediction model toward the more common classes, and as such severely degrading the performance of the trained prediction model. Consequently, it is often necessary to balance the training dataset by forcing the number of face images per group/person to be substantially equal to a fixed number (also referred to as "target size" hereinafter). In some embodiments, if the number in an unbalanced group of identically-labeled images is larger than the target size, balancing the group of images then involves removing some images (e.g., some duplicated images) from the unbalanced group of images. In contrast, if the number in an unbalanced group of identically-labeled images is smaller than the target size, balancing the group of images then involves adding more images into the unbalanced group of images. As shown in FIG. 4, training dataset balancing module 404 receives cleaned training dataset 412 as inputs, performs the above-described data balancing operations on each unbalanced group of images based on a target size, and generates cleaned and balanced training dataset 414 as outputs.

Figure 10:
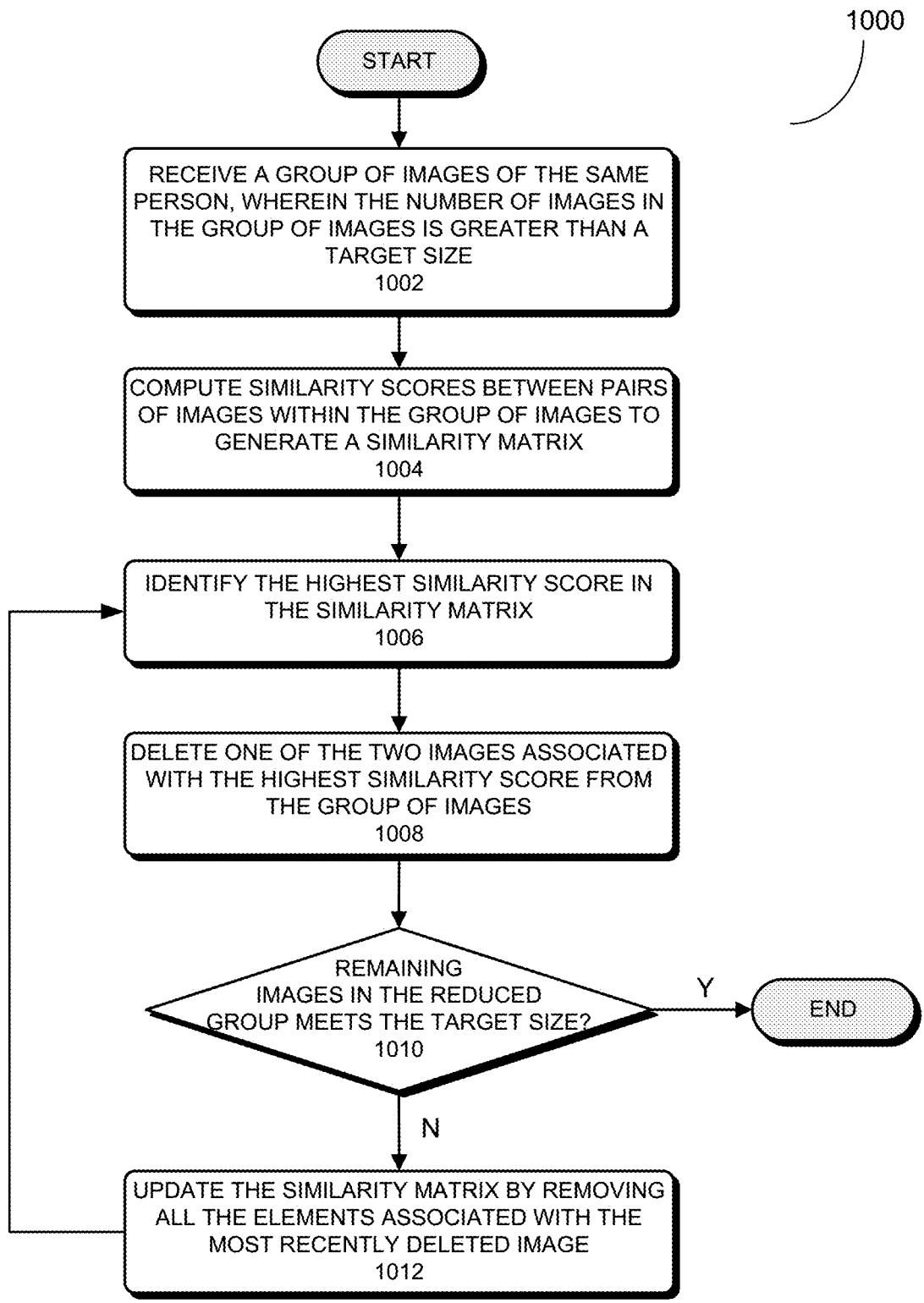
FIG. 10 presents a flowchart illustrating an exemplary process for removing duplicated images from an unbalanced group of identically-labeled images in accordance with some embodiments described herein.

FIG. 10 presents a flowchart illustrating an exemplary process 1000 for removing duplicated images from an unbalanced group of identically-labeled images in accordance with some embodiments described herein. The process 1000 may begin by receiving a group of images of the same person, wherein the number of images in the group of images is greater than a target size (step 1002). In some embodiments, the target size is a predetermined number between 100 and 500. Next, the process computes similarity scores between pairs of images within the group of images (step 1004). In one embodiment, the process computes a similarity score between a given pair of images by using a pre-trained face embedding model, which converts each face image into a one dimensional (e.g., 1024, 2048, or 4096) feature vector, and then computes the similarity score of the pair of images as a Euclidean distance between the two corresponding 1D feature vectors. Note that step 1004 also generates a similarity matrix for the group of images.

Next, the process identifies the highest similarity score among the similarity scores for the group of images (step 1006). Prior to identifying the highest similarity score, the process may sort the computed similarity scores in an increasing or decreasing order to facilitate identifying the highest similarity score. The process subsequently deletes one of the two images associated with the highest similarity score from the group of images (step 1008). In some embodiments, to determine which of the two images associated with the highest similarity score to be deleted, the process first computes an average similarity score for each of the two images based on their intra-group similarity scores. For example, for an image $I_1$, the set of intra-group similarity scores can be expressed as $S_{1j}$ where $j=2, 3, \ldots, N$, and the average similarity score can be expressed as $$\frac{1}{N-1} \sum_j S_{1j}.$$

Hence, the process can remove the image in the pair of images having a higher average similarity score, because this image has a higher probability to be a duplicated image than the other image of the two images.

Next, the process determines if the number of remaining images in the reduced group of images meets the target size (step 1010). If so, the balancing operation for the current group of identically-labeled images is complete. Otherwise, the process updates the similarity matrix by removing all the elements associated with the most recently deleted image (step 1012) and returns to step 1006. In some embodiments, prior to returning to step 1006, the process may sort the elements in the updated similarity matrix in an increasing or decreasing order to facilitate identifying the new highest similarity score. Hence, the sub-process loop including steps 1006-1012 repeats until the target size in the remaining group of images is reached. Note also that for balance the entire cleaned training dataset 412, the process 1000 is also repeated for all of the groups of unbalanced face images having the number of images greater than the target size. As a result, the final balanced training dataset 414 includes multiple groups of balanced face images corresponding to multiple people, wherein no single group of images has the number of images greater than the target size.

In some embodiments, instead of iteratively reducing the input group of images down to the target size as described in conjunction with FIG. 10, a predetermined threshold similarity score (or "threshold score") can be applied to the similarity matrix. More specifically, after computing the similarity scores, all of the similarity scores greater than the threshold score are identified. Next, for each of the identified similarity scores greater than the threshold score, one of the two images associated with that score can be deleted. For example, the process can employ the above-described average similarity score technique to choose which one of the two images to be deleted. Note that the disclosed process can be applied to the identified similarity scores in a certain order, e.g., starting from the highest identified similarity score. Each time an image is deleted, the identified similarity scores are updated by removing those scores in the identified similarity scores involving the deleted image. The process is then repeated on the updated set of identified similarity scores greater than the threshold score, wherein the highest score in the updated set of identified similarity scores is processed. When the process is completed, a subset of the group of images remains, wherein no similarity score between any given pair of images in the remaining images is greater than the predetermined threshold score. In some embodiments, the predetermined threshold score is a value greater than or equal to 0.85. Note that when the threshold score is used to balance the input dataset, the number of remaining images associated with each balanced group of images can be different from the target size.

Figure 11:
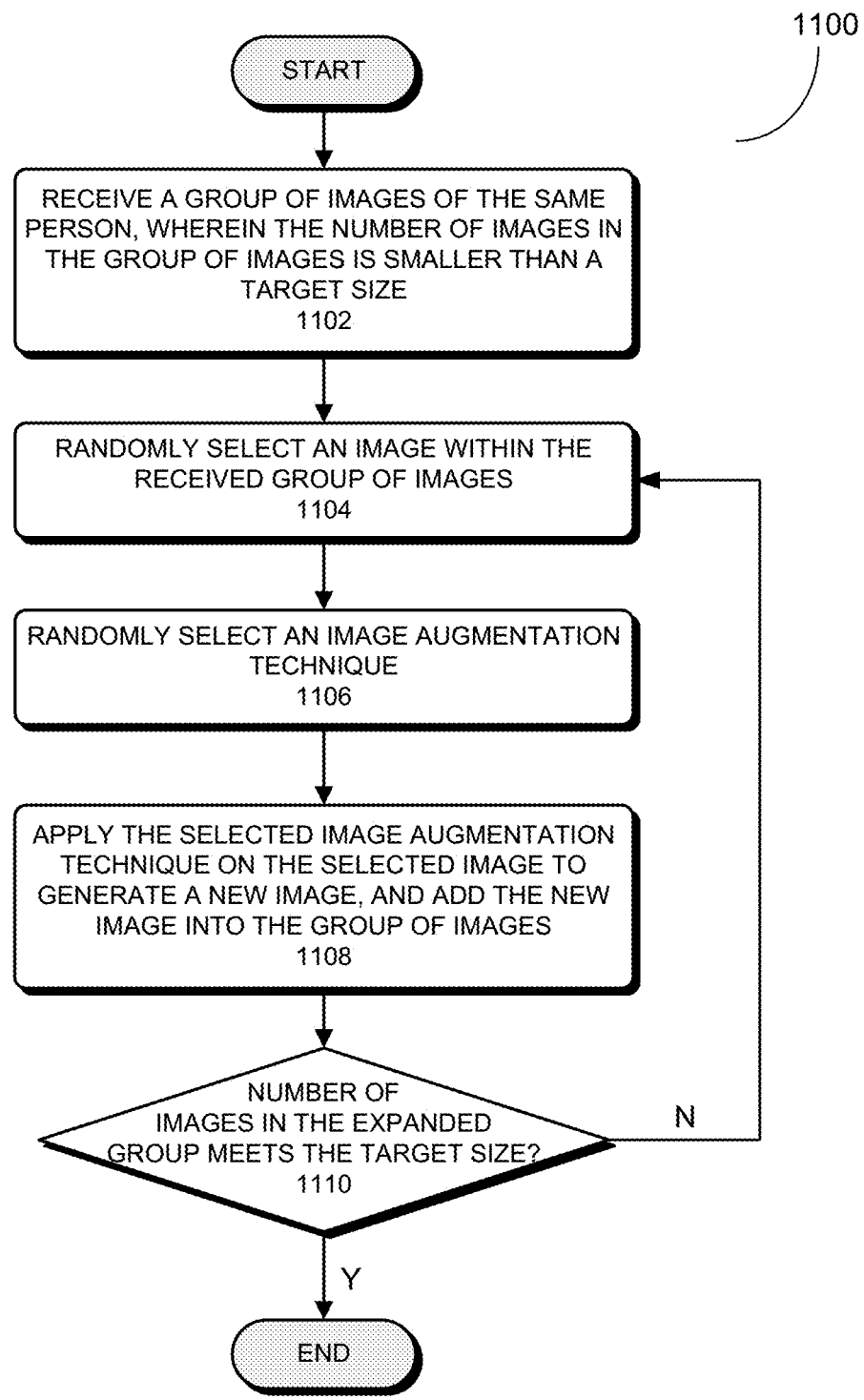
FIG. 11 presents a flowchart illustrating an exemplary process for adding images into an unbalanced group of identically-labeled images in accordance with some embodiments described herein.

FIG. 11 presents a flowchart illustrating an exemplary process 1100 for adding images into an unbalanced group of identically-labeled images in accordance with some embodiments described herein. The process 1100 may begin by receiving a group of images of the same person, wherein the number of images in the group of images is smaller than a target size (step 1102). In some embodiments, the target size is a predetermined number between 100 and 500. Next, the process randomly selects an image within the received group of images (step 1104). Next, the process randomly selects an image augmentation technique (step 1106).

The different image augmentation techniques that can be selected from can include an image compression technique. For example, a JPEG compression process can be applied on a JPEG image to change some of the pixel values. Note that while a compressed image can lose some original information, the image size can stay the same after the compression. Another image augmentation technique which can be selected in step 1106 includes mean filtering which when applied to an image often results in reducing the image quality to some extend. Yet another image augmentation technique which can be selected in step 1106 includes color distortion, e.g., by multiplying one of the three color channels with a distortion factor or by multiplying the three color channels with different distortion factors. Yet another image augmentation technique which can be selected in step 1106 includes either downsampling or upsampling an input image.

After selecting the image augmentation technique, the process then applies the selected image augmentation technique on the selected image to generate a new image, and subsequently adds the new image into the unbalanced group of images (step 1108). Next, the process determines if the number of images in the expanded group of images meets the target size (step 1110). If so, the balancing operation for the current group of identically-labeled images is complete. Otherwise, the process returns to step 1104, where another random image is selected from the expanded group of images, and another image augmentation technique is randomly selected. In this manner, the sub-process loop including steps 1104-1110 repeats until the expanded group of images reaches the target size and becomes a balanced group of images. Note that for balancing the entire cleaned training dataset 412, the process 1100 is also repeated for all of the groups of unbalanced face images having the number of images smaller than the target size. As a result, the final balanced training dataset 414 includes multiple groups of balanced face images corresponding to multiple people, wherein no single group of images has the number of images smaller than the target size.

Training Dataset Post-Processing Module

As mentioned above, after face images are detected and cropped out of original input images discovered from the Internet, the raw face images typically have different sizes and the faces within the raw face images can have different positions within the images (i.e., not centered). Hence, prior to performing image cleaning and balancing, the raw face images are often preprocessed by resizing and centering each of the raw face images so that the preprocessed images all have the same size and the faces within the preprocessed images are all substantially centered. The preprocessed images can then be processed by the subsequent cleaning and balancing modules described above.

Referring back to FIG. 4, note that the disclosed high-quality-training-dataset-generation subsystem 400 can optionally include a training dataset post-processing module 406 following training dataset balancing module 404. In some embodiments, the training face image dataset after cleaning and balancing can be further post-processed. After training data cleaning and balancing, it is assumed that the processed images remain centered and have the same size. Consequently, some of the post-processing operations mainly involve face alignment and margin correction. In some embodiments, the images added into the training dataset during the balancing operation can have sizes different from the standard image size. For these images, the post-processing operations also include resizing of such images to the standard image size.

Using the High-Quality Training Dataset

High-quality-training-dataset-generation subsystem 400 eventually outputs high-quality training dataset 416 comprising groups of cleaned and balanced face images, wherein each group of faces images includes a set of standardized face images of the same size, and faces that are substantially centered and have substantially the same alignments. In the exemplary system shown in FIG. 1, high-quality training dataset 416 (i.e., training dataset 118) is used to train a deep-neural-network-based face-recognition-model training system 108 and to generate a high-performance face recognition model 124.

Some of the deep network frameworks which can be used to implement face-recognition-model training system 108 can include, but are not limited to VGGNet, ResNet, DenseNet, Dual Pathway Network, MobileNet, FaceNet, and Inception v1-v3. In some embodiments, training face-recognition-model training system 108 with high-quality training dataset 118 involves first training the network with a small portion of high-quality training dataset 118 on model training subsystem 120, and then fine-tuning the network with a large portion of high-quality training dataset 118 on model fine-tuning subsystem 122.

Trained face recognition model 124 generated by training system 108 can then be used in various face recognition systems/applications such as in home and building security systems and for surveillance video analysis to assist accident investigations or customer analysis in retail market research. Note that the disclosed technology of this disclosure facilitates generating large-scale, diverse, and balanced face-image training dataset composed of highly-accurately-labeled faces, which can be used to build high-quality face recognition systems and to improve the accuracy and reliability of the existing face recognition systems.

Figure 12:
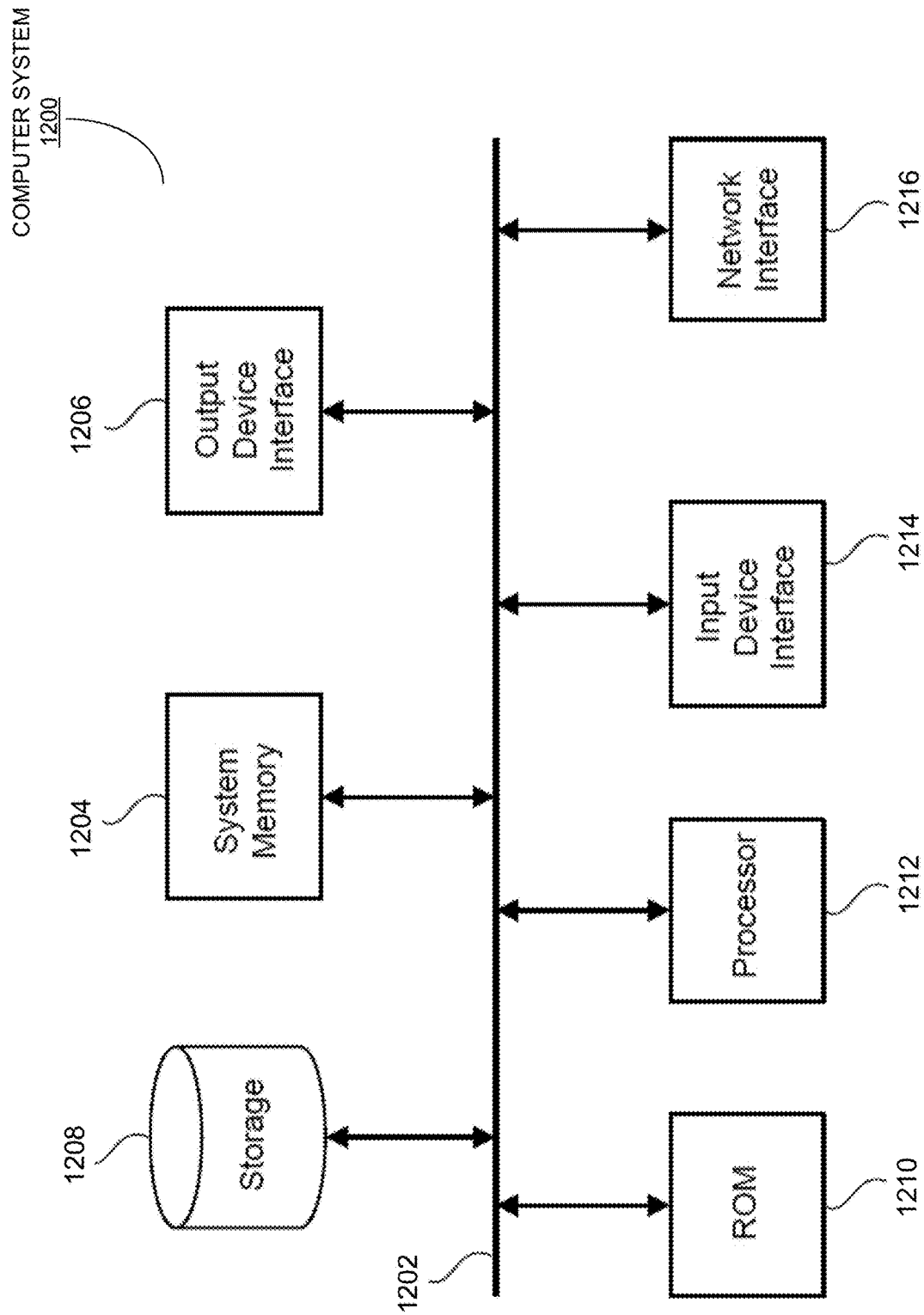
FIG. 12 conceptually illustrates a computer system with which some embodiments of the subject technology can be implemented.

FIG. 12 conceptually illustrates a computer system with which some embodiments of the subject technology can be implemented. Computer system 1200 can be a client, a server, a computer, a smartphone, a PDA, a laptop, or a tablet computer with one or more processors embedded therein or coupled thereto, or any other sort of computing device. Such a computer system includes various types of computer readable media and interfaces for various other types of computer readable media. Computer system 1200 includes a bus 1202, processing unit(s) 1212, a system memory 1204, a read-only memory (ROM) 1210, a permanent storage device 1208, an input device interface 1214, an output device interface 1006, and a network interface 1216.

Bus 1202 collectively represents all system, peripheral, and chipset buses that communicatively connect the numerous internal devices of computer system 1200. For instance, bus 1202 communicatively connects processing unit(s) 1212 with ROM 1210, system memory 1204, and permanent storage device 1208.

From these various memory units, processing unit(s) 1212 retrieves instructions to execute and data to process in order to execute various processes described in this patent disclosure, including the above-described processes of training dataset generation, preprocessing, cleaning, balancing, and post-processing in conjunction with FIGS. 2-11. The processing unit(s) 1212 can include any type of processor, including, but not limited to, a microprocessor, a graphic processing unit (GPU), a tensor processing unit (TPU), an intelligent processor unit (IPU), a digital signal processor (DSP), a field-programmable gate array (FPGA), and an application-specific integrated circuit (ASIC). Processing unit(s) 1212 can be a single processor or a multi-core processor in different implementations.

ROM 1210 stores static data and instructions that are needed by processing unit(s) 1212 and other modules of the computer system. Permanent storage device 1208, on the other hand, is a read-and-write memory device. This device is a non-volatile memory unit that stores instructions and data even when computer system 1200 is off. Some implementations of the subject disclosure use a mass-storage device (such as a magnetic or optical disk and its corresponding disk drive) as permanent storage device 1208.

Other implementations use a removable storage device (such as a floppy disk, flash drive, and its corresponding disk drive) as permanent storage device 1208. Like permanent storage device 1208, system memory 1204 is a read-and-write memory device. However, unlike storage device 1208, system memory 1204 is a volatile read-and-write memory, such a random access memory. System memory 1204 stores some of the instructions and data that the processor needs at runtime. In some implementations, various processes described in this patent disclosure, including the processes of generating, preprocessing, cleaning, and balancing raw training dataset in conjunction with FIGS. 2-11, are stored in system memory 1204, permanent storage device 1208, and/or ROM 1210. From these various memory units, processing unit(s) 1212 retrieves instructions to execute and data to process in order to execute the processes of some implementations.

Bus 1202 also connects to input and output device interfaces 1214 and 1206. Input device interface 1214 enables the user to communicate information and select commands to the computer system. Input devices used with input device interface 1214 include, for example, alphanumeric keyboards and pointing devices (also called "cursor control devices"). Output device interfaces 1206 enables, for example, the display of images generated by the computer system 1200. Output devices used with output device interface 1206 include, for example, printers and display devices, such as cathode ray tubes (CRT) or liquid crystal displays (LCD). Some implementations include devices such as a touchscreen that functions as both input and output devices.

Finally, as shown in FIG. 12, bus 1202 also couples computer system 1200 to a network (not shown) through a network interface 1216. In this manner, the computer can be a part of a network of computers (such as a local area network ("LAN"), a wide area network ("WAN"), or an Intranet, or a network of networks, such as the Internet. Any or all components of computer system 1200 can be used in conjunction with the subject disclosure.

The various illustrative logical blocks, modules, circuits, and algorithm steps described in connection with the embodiments disclosed in this patent disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer-implemented method for preparing high-quality face-image training data for a face recognition system, the method comprising:
    receiving a training dataset including a plurality of groups of identically-labeled face images associated with a plurality of identities, wherein each group of identically-labeled face images is labeled with an associated identity among the plurality of identities, and wherein the training dataset includes a set of undesirable images;
    for each group of identically-labeled face images of an associated identity in the training dataset,
        identifying a subset of undesirable face images within the group of identically-labeled face images; and
        generating a cleaned group of identically-labeled face images of the associated identity by removing the subset of undesirable images from the group of identically-labeled face images; and
    combining the cleaned plurality of groups of identically-labeled face images associated with the plurality of identities to obtain a cleaned training dataset of labeled face images for use in training a face recognition model.

2. The computer-implemented method of claim 1, wherein identifying the subset of undesirable images within the group of identically-labeled face images includes:
    identifying a subset of highly-similar images within the group of identically-labeled face images as a first reference image set;
    designating images in the group of identically-labeled face images but not in the first reference image set as a first candidate image set; and
    identifying the subset of undesirable images from the first candidate image set based on the first reference image set.

3. The computer-implemented method of claim 2, wherein identifying the subset of highly-similar images within the group of identically-labeled face images as the first reference image set includes:
    computing a similarity matrix of pairs of images in the group of identically-labeled face images, wherein each element in the similarity matrix is a similarity score between the corresponding pair of images in the group of identically-labeled face images;

applying a first threshold value to the similarity matrix to separate the elements in the similarity matrix into a first set of elements greater than or equal to the first threshold and a second set of elements smaller than the first threshold;

processing the first set of elements to generate one or more image clusters, wherein each image cluster includes a subset of face images in the group of identically-labeled face images that is associated with the first set of elements, and each image cluster includes one or more images which are determined to be highly similar to one another; and identifying an image cluster within the one or more image clusters that contains the largest number of images among the one or more image clusters as the first reference set.

4. The computer-implemented method of claim 3, wherein processing the first set of elements to generate the one or more image clusters includes building one or more connected graphs based on the associated set of similarity scores.

5. The computer-implemented method of claim 3, wherein computing the similarity matrix for the group of identically-labeled face images includes:

extracting a feature vector for each image in the group of identically-labeled face images based on a pre-trained face embedded model; and for each pair of the images in the group of identically-labeled face images, computing the similarity score between the pair of image as a Euclidean distance between the two associated feature vectors.

6. The computer-implemented method of claim 3, wherein the method further comprises selecting the first threshold value such that the probability that two identically-labeled face images do not have the same identity when the similarity score between the two identically-labeled face images being greater than or equal to the first threshold is below a used-specified error rate.

7. The computer-implemented method of claim 3, wherein identifying the subset of undesirable images in the first candidate image set include:

identifying a first subset of images in the first candidate image set as being qualified for recollection and a second subset of images in the first candidate image set as being unqualified for recollection; and further identifying the subset of undesirable images in the second subset of images unqualified for recollection.

8. The computer-implemented method of claim 7, wherein identifying the first subset of images in the first candidate image set as being qualified for recollection includes:

for each image in the first candidate image set,
    obtaining a set of similarity scores between the image and each image in the first reference image set; and
    computing a combined similarity score of the image with respect to the first reference image set; and applying a second threshold value to the set of combined similarity scores computed for the first candidate image set to separate the first candidate image set into the first subset of images qualified for recollection and the second subset of images not qualified for recollection.

9. The computer-implemented method of claim 8, wherein the method further comprises:

combining the first reference image set and the first subset of images qualified for recollection to obtain the cleaned group of identically-labeled face images; and identifying the second subset of images not qualified for recollection as the subset of undesirable images.

10. The computer-implemented method of claim 8, wherein the method further comprises selecting the second threshold value such that the probability that an image having a combined similarity score with respect to the first reference image set greater than or equal to the second threshold value does not have the same identity as the first reference image set is below a used-specified error rate.

11. The computer-implemented method of claim 8, wherein the second threshold value is smaller than the first threshold value.

12. The computer-implemented method of claim 8, wherein computing the combined similarity score of the image with respect to the first reference image set includes computing a weighted average of the set of computed similarity scores.

13. The computer-implemented method of claim 12, wherein computing the weighted average of the set of computed similarity scores includes providing a higher weight value to a larger similarity score in the set of computed similarity scores.

14. The computer-implemented method of claim 12, wherein for a computed similarity score, the weight value associated with the computed similarity score in the weighted average is determined based on $\exp(r \cdot s)$, wherein r is a positive number between 2-10 and s is the computed similarity score.

15. The computer-implemented method of claim 8, wherein the method further comprises:

forming a second reference image set by combining the first reference image set and the first subset of images qualified for recollection;

designating images in the group of identically-labeled face images but not in the second reference image set as a second candidate image set; and identifying the subset of undesirable images in the second candidate image set based on the second reference image set.

16. The computer-implemented method of claim 15, wherein identifying the subset of undesirable images in the second candidate image set based on the second reference image set includes:

for each image in the second candidate image set,
    computing a set of similarity scores between the image and each image in the second reference image set; and
    computing a combined similarity score of the image with respect to the second reference image set; and applying a third threshold value to the set of combined similarity scores associated with the second candidate image set to separate the second candidate image set into a third subset of images which is qualified for recollection and a fourth subset of images which is not qualified for recollection; and identifying the fourth subset of images not qualified for recollection as the subset of undesirable images.

17. The computer-implemented method of claim 16, wherein the method further comprises combining the second reference image set and the third subset of images qualified for recollection to obtain the cleaned group of identically-labeled face images of the associated identity without the subset of undesirable images.

18. The computer-implemented method of claim 16, wherein the third threshold value is smaller than the second threshold value, and wherein the second threshold value is smaller than the first threshold value.

19. The computer-implemented method of claim 1, wherein prior to receiving the training dataset, the method further comprises using one or more image crawlers and the plurality of identities as search queries to mine a set of loosely-labeled images matching the plurality of identities on the Internet.

20. The computer-implemented method of claim 19, wherein the method further comprises generating the training dataset by:
for each loosely-labeled image in the set of loosely-labeled images,
detecting one or more faces within the loosely-labeled image; and
cropping out one or more face images associated with the one or more detected faces from the loosely-labeled image; and
forming a group of identically-labeled face images by combining a set of cropped face images from a subset of loosely-labeled images of the same identity.

21. The computer-implemented method of claim 20, wherein prior to forming the group of identically-labeled face images, the method further comprises preprocessing the set of cropped face images so that the preprocessing set of cropped face images have an identical image size and the faces within the preprocessed set of cropped face images are substantially centered within the respective face images.

22. The computer-implemented method of claim 20, wherein preprocessing the set of cropped face images further includes performing rotation operations on the set of cropped face images so that the preprocessing set of cropped face images have substantially the same pose.

23. The computer-implemented method of claim 1, wherein the plurality of identities includes both a set of Asian people and a set of non-Asian people.

24. The computer-implemented method of claim 1, wherein after generating the cleaned group of identically-labeled face images of the associated identity, the method further comprises:
balancing each of the cleaned group of identically-labeled face images by forcing the number of face images within the cleaned group of identically-labeled face images to be equal to a target number; and
combining the cleaned and balanced groups of identically-labeled face images to obtain a high-quality training dataset for use in training a face recognition model.

25. The computer-implemented method of claim 1, wherein the set of undesirable images includes one or more of:
a subset of images wherein each image in the subset is labeled with an identity that does not match the person within the image;
a subset of images wherein each image in the subset does not have a person;
a subset of images wherein each image in the subset has a very low quality; and
a subset of images which are substantially identical to one another.

26. An apparatus for preparing high-quality face-image training data for a face recognition system, comprising:
one or more processors; and
a memory storing instructions that, when executed by the one or more processors, cause the apparatus to:
receive a training dataset including a plurality of groups of identically-labeled face images associated with a plurality of identities, wherein each group of identically-labeled face images is labeled with an associated identity among the plurality of identities, and wherein the training dataset includes a set of undesirable images;
for each group of identically-labeled face images of an associated identity in the training dataset,
identify a subset of undesirable face images within the group of identically-labeled face images; and
generate a cleaned group of identically-labeled face images of the associated identity by removing the subset of undesirable images from the group of identically-labeled face images; and
combine the cleaned plurality of groups of identically-labeled face images associated with the plurality of identities to obtain a cleaned training dataset of labeled face images for use in training a face recognition model.

27. The apparatus of claim 26, wherein the memory further stores instructions that, when executed by the one or more processors, cause the apparatus to identify the subset of undesirable images within the group of identically-labeled face images by:
identifying a subset of highly-similar images within the group of identically-labeled face images as a first reference image set;
designating images in the group of identically-labeled face images but not in the first reference image set as a first candidate image set; and
identifying the subset of undesirable images from the first candidate image set based on the first reference image set.

28. The apparatus of claim 27, wherein the memory further stores instructions that, when executed by the one or more processors, cause the apparatus to identify the subset of highly-similar images within the group of identically-labeled face images as the first reference image set by:
computing a similarity matrix of pairs of images in the group of identically-labeled face images, wherein each element in the similarity matrix is a similarity score between the corresponding pair of images in the group of identically-labeled face images;
applying a first threshold value to the similarity matrix to separate the elements in the similarity matrix into a first set of elements greater than or equal to the first threshold and a second set of elements smaller than the first threshold;
processing the first set of elements to generate one or more image clusters, wherein each image cluster includes a subset of face images in the group of identically-labeled face images that is associated with the first set of elements, and each image cluster includes one or more images which are determined to be highly similar to one another; and
identifying an image cluster within the one or more image clusters that contains the largest number of images among the one or more image clusters as the first reference set.

29. The apparatus of claim 28, wherein the memory further stores instructions that, when executed by the one or more processors, cause the apparatus to identify the subset of undesirable images in the first candidate image set by:

identifying a first subset of images in the first candidate image set as being qualified for recollection and a second subset of images in the first candidate image set as being unqualified for recollection; and further identifying the subset of undesirable images in the second subset of images unqualified for recollection.

30. The apparatus of claim 29, wherein the memory further stores instructions that, when executed by the one or more processors, cause the apparatus to identify the first subset of images in the first candidate image set as being qualified for recollection by:

for each image in the first candidate image set,
obtaining a set of similarity scores between the image and each image in the first reference image set, and
computing a combined similarity score of the image with respect to the first reference image set; and applying a second threshold value to the set of combined similarity scores computed for the first candidate image set to separate the first candidate image set into the first subset of images qualified for recollection and the second subset of images not qualified for recollection.

31. The apparatus of claim 30, wherein the memory further stores instructions that, when executed by the one or more processors, cause the apparatus to:

combine the first reference image set and the first subset of images qualified for recollection to obtain the cleaned group of identically-labeled face images; and identify the second subset of images not qualified for recollection as the subset of undesirable images.

32. The apparatus of claim 30, wherein the memory further stores instructions that, when executed by the one or more processors, cause the apparatus to:

form a second reference image set by combining the first reference image set and the first subset of images qualified for recollection;

designate images in the group of identically-labeled face images but not in the second reference image set as a second candidate image set; and identify the subset of undesirable images in the second candidate image set based on the second reference image set.

33. The apparatus of claim 32, wherein the memory further stores instructions that, when executed by the one or more processors, cause the apparatus to identify the subset of undesirable images in the second candidate image set based on the second reference image set by:

for each image in the second candidate image set,
computing a set of similarity scores between the image and each image in the second reference image set; and
computing a combined similarity score of the image with respect to the second reference image set; and applying a third threshold value to the set of combined similarity scores associated with the second candidate image set to separate the second candidate image set into a third subset of images which is qualified for recollection and a fourth subset of images which is not qualified for recollection; and identifying the fourth subset of images not qualified for recollection as the subset of undesirable images.

34. The apparatus of claim 32, wherein the memory further stores instructions that, when executed by the one or more processors, cause the apparatus to combine the second reference image set and the third subset of images qualified for recollection to obtain the cleaned group of identically-labeled face images of the associated identity without the subset of undesirable images.

35. A system for preparing high-quality face-image training data for a face recognition system, the system comprising:

one or more processors;
a memory coupled to the one or more processors;
a receiving module configured to receive a training dataset including a plurality of groups of identically-labeled face images associated with a plurality of identities, wherein each group of identically-labeled face images is labeled with an associated identity among the plurality of identities, and wherein the training dataset includes a set of undesirable images;

a training dataset cleaning module configured to, for each group of identically-labeled face images of an associated identity in the training dataset:
identify a subset of undesirable face images within the group of identically-labeled face images; and
generate a cleaned group of identically-labeled face images of the associated identity by removing the subset of undesirable images from the group of identically-labeled face images; and a training dataset generation module configured to combine the cleaned plurality of groups of identically-labeled face images associated with the plurality of identities to obtain a cleaned training dataset of labeled face images for use in training a face recognition model.

36. The system of claim 35, wherein the training dataset cleaning module is further configured to:

identify a subset of highly-similar images within the group of identically-labeled face images as a first reference image set;

designate images in the group of identically-labeled face images but not in the first reference image set as a first candidate image set; and identify the subset of undesirable images from the first candidate image set based on the first reference image set.

37. The system of claim 36, wherein the training dataset cleaning module is further configured to:

compute a similarity matrix of pairs of images in the group of identically-labeled face images, wherein each element in the similarity matrix is a similarity score between the corresponding pair of images in the group of identically-labeled face images;

apply a first threshold value to the similarity matrix to separate the elements in the similarity matrix into a first set of elements greater than or equal to the first threshold and a second set of elements smaller than the first threshold;

process the first set of elements to generate one or more image clusters, wherein each image cluster includes a subset of face images in the group of identically-labeled face images that is associated with the first set of elements, and each image cluster includes one or more images which are determined to be highly similar to one another; and identifying an image cluster within the one or more image clusters that contains the largest number of images among the one or more image clusters as the first reference set.

38. The system of claim 36, wherein the training dataset cleaning module is further configured to:

identify a first subset of images in the first candidate image set as being qualified for recollection and a second subset of images in the first candidate image set as being unqualified for recollection; and further identify the subset of undesirable images in the second subset of images unqualified for recollection.

39. The system of claim 38, wherein the training dataset cleaning module is further configured to identify the subset of undesirable images by:
- for each image in the first candidate image set,
  - obtain a set of similarity scores between the image and each image in the first reference image set; and
  - compute a combined similarity score of the image with respect to the first reference image set;
- apply a second threshold value to the set of combined similarity scores computed for the first candidate image set to separate the first candidate image set into the first subset of images qualified for recollection and the second subset of images not qualified for recollection;
- combine the first reference image set and the first subset of images qualified for recollection to obtain the cleaned group of identically-labeled face images; and
- identify the second subset of images not qualified for recollection as the subset of undesirable images.

* * * * *